US009865299B2

(12) United States Patent
Ueda et al.

(10) Patent No.: US 9,865,299 B2
(45) Date of Patent: Jan. 9, 2018

(54) INFORMATION PROCESSING DEVICE, INFORMATION RECORDING MEDIUM, INFORMATION PROCESSING METHOD, AND PROGRAM

(71) Applicants: SONY CORPORATION, Tokyo (JP); PANASONIC CORPORATION, Kadoma-shi (JP)

(72) Inventors: Kenjiro Ueda, Kanagawa (JP); Tateo Oishi, Saitama (JP); Kouichi Uchimura, Kanagawa (JP); Masaya Yamamoto, Kyoto (JP); Kaoru Murase, Nara (JP); Hiroshi Yahata, Osaka (JP)

(73) Assignees: SONY CORPORATION, Tokyo (JP); PANASONIC CORPORATION, Kadoma-shi (JP)

( * ) Notice: Subject to any disclaimer, the term of this patent is extended or adjusted under 35 U.S.C. 154(b) by 259 days.

(21) Appl. No.: 14/944,748

(22) Filed: Nov. 18, 2015

(65) Prior Publication Data
US 2016/0155466 A1 Jun. 2, 2016

Related U.S. Application Data
(60) Provisional application No. 62/085,453, filed on Nov. 28, 2014.

(51) Int. Cl.
G06F 11/30 (2006.01)
G06F 12/14 (2006.01)
(Continued)

(52) U.S. Cl.
CPC .. G11B 20/00492 (2013.01); G11B 20/00086 (2013.01); G11B 20/00188 (2013.01);
(Continued)

(58) Field of Classification Search
CPC ........ G11B 20/00492; G11B 20/00086; G11B 20/00188; H04L 9/0816; H04L 9/0822;
(Continued)

(56) References Cited

U.S. PATENT DOCUMENTS 5,832,126 A * 11/1998 Tanaka ...................... G06T 9/00
382/176
2001/0018731 A1 * 8/2001 Fujii ........................ G06F 12/023
711/170
(Continued)

FOREIGN PATENT DOCUMENTS

JP 2001-167528 A 6/2001
JP 2006-236120 A 9/2006
(Continued)

OTHER PUBLICATIONS

Alex Graves1; Connectionist Temporal Classification: Labelling Unsegmented Sequence Data with Recurrent Neural Networks; ACM 2006; p. 369-376.*
(Continued)

Primary Examiner — Monjour Rahim
(74) Attorney, Agent, or Firm — Oblon, McClelland, Maier & Neustadt, L.L.P.

(57) ABSTRACT

Provided is an information processing device including a data processing unit that executes reproduction processing of content recorded in an information recording medium. The content includes an individual segment region formed of a plurality of variation data in which identification information different from each other is embedded and each of which can be decrypted by a different key, and a common segment region formed of single data. The variation data is formed of a 6144 byte aligned unit. The data processing unit calculates a reproduction path by applying a device key held in a memory, and selects an aligned unit corresponding to one variation data that corresponds to the calculated repro-
(Continued)

duction path from a plurality of aligned units configuring the plurality of variation data in the individual segment region included in the data read from the information recording medium, and then, executes the decryption and reproduction processing.

18 Claims, 24 Drawing Sheets

(51) Int. Cl.
G11B 20/00 (2006.01)
H04L 9/08 (2006.01)

(52) U.S. Cl.
CPC .......... *H04L 9/0816* (2013.01); *H04L 9/0822* (2013.01); *H04L 2209/24* (2013.01); *H04L 2209/603* (2013.01); *H04L 2209/608* (2013.01)

(58) Field of Classification Search
CPC .......... H04L 2209/24; H04L 2209/603; H04L 2209/608
USPC ....................................................... 713/189
See application file for complete search history.

(56) References Cited

U.S. PATENT DOCUMENTS

| | | | | |
|---|---|---|---|---|
| 2002/0168095 | A1* | 11/2002 | Spreeuwers | B82Y 30/00 382/128 |
| 2003/0229813 | A1* | 12/2003 | Shiiyama | G06F 1/3203 713/300 |
| 2004/0095808 | A1* | 5/2004 | Kurata | G11C 11/5628 365/185.28 |
| 2004/0184307 | A1* | 9/2004 | Saito | G11C 7/14 365/145 |
| 2005/0062785 | A1* | 3/2005 | Oguri | B41J 2/04505 347/19 |
| 2005/0265700 | A1 | 12/2005 | Kato | |
| 2006/0027733 | A1* | 2/2006 | Terzioglu | H04N 5/361 250/208.1 |
| 2006/0291815 | A1 | 12/2006 | Kato | |
| 2007/0195893 | A1* | 8/2007 | Kim | H04N 19/115 375/240.27 |
| 2008/0022131 | A1 | 1/2008 | Ueda et al. | |
| 2009/0097154 | A1* | 4/2009 | Raymond | G11B 5/59638 360/76 |
| 2009/0213424 | A1* | 8/2009 | Watanabe | G06F 3/1212 358/1.15 |
| 2010/0098250 | A1 | 4/2010 | Schultz et al. | |
| 2010/0215344 | A1 | 8/2010 | Kato | |

FOREIGN PATENT DOCUMENTS

| | | |
|---|---|---|
| JP | 2006-236121 A | 9/2006 |
| JP | 2007-43336 A | 2/2007 |
| JP | 2010-526514 A | 7/2010 |

OTHER PUBLICATIONS

International Search Report dated Feb. 16, 2016 in PCT/JP2015/082803 (with English language translation).

Hideyuki Kakuno, et al., "Robust Digital Watermark for Video Signals" The Journal of the Institute of Image Information and Television Engineers, vol. 54, No. 4, 2000, pp. 593-600.

Hiroyuki Yamashita, et al., "Digital watermarks embedded into motion pictures by using vectors that compensate motions" The 27$^{th}$ Symposium on Information Theory and Its Applications (SITA2004), Dec. 2004, pp. 511-514.

* cited by examiner

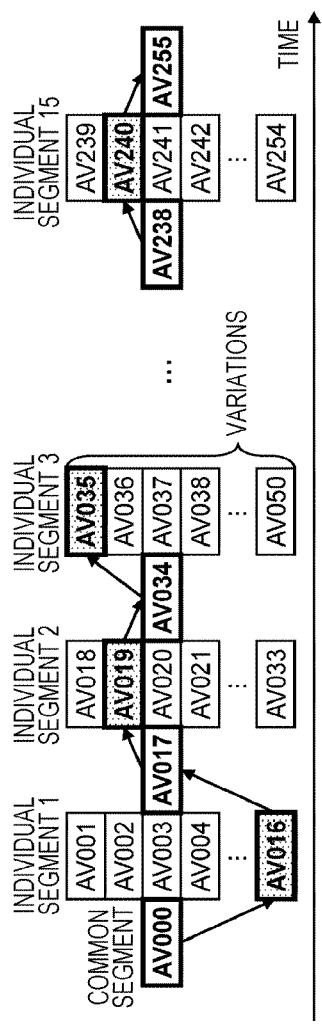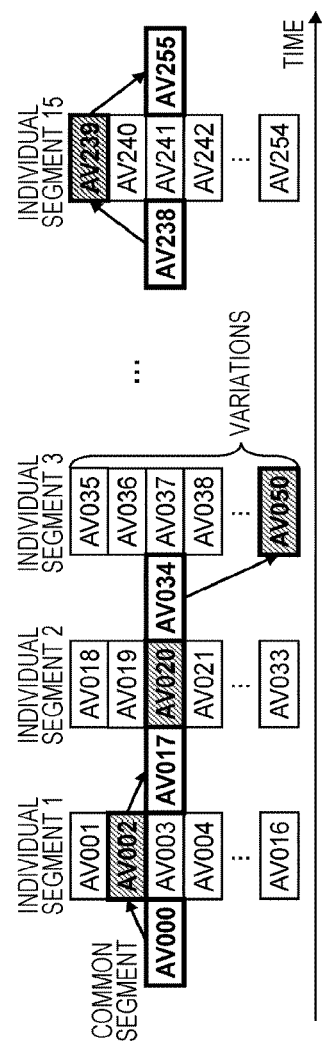

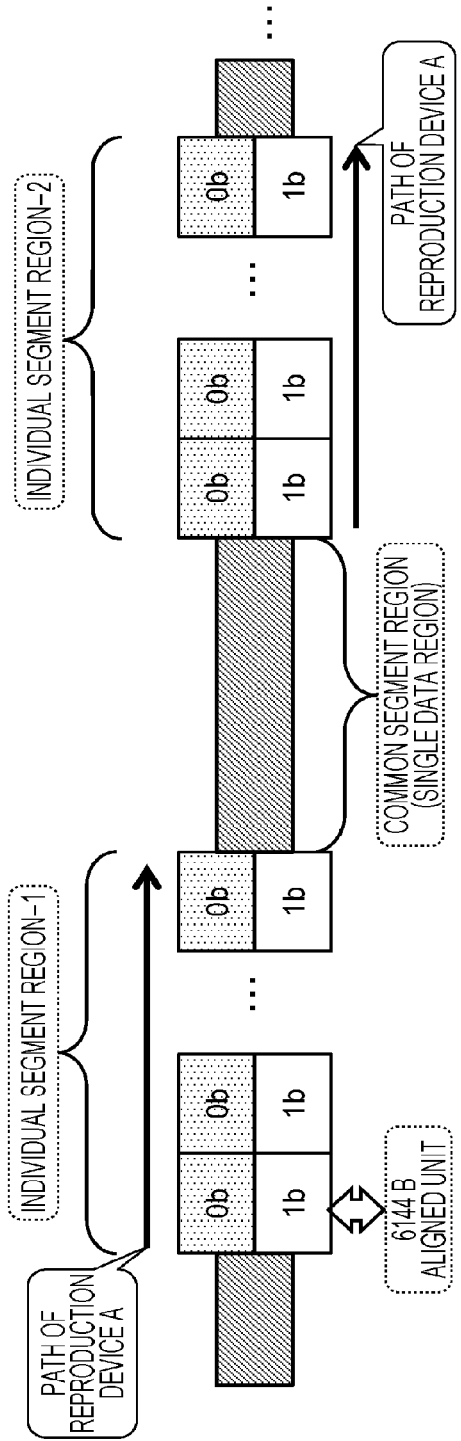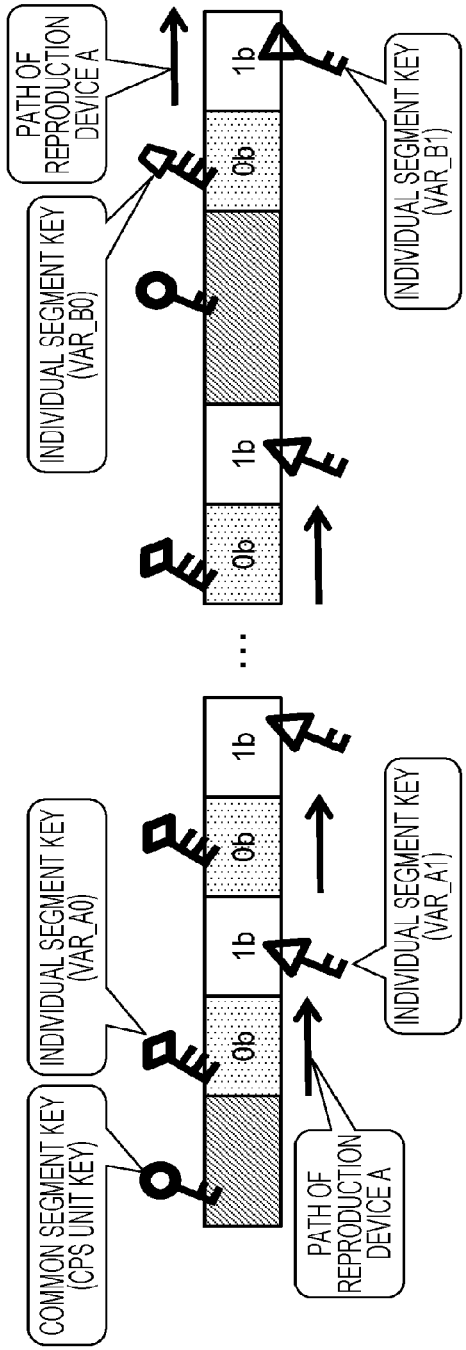

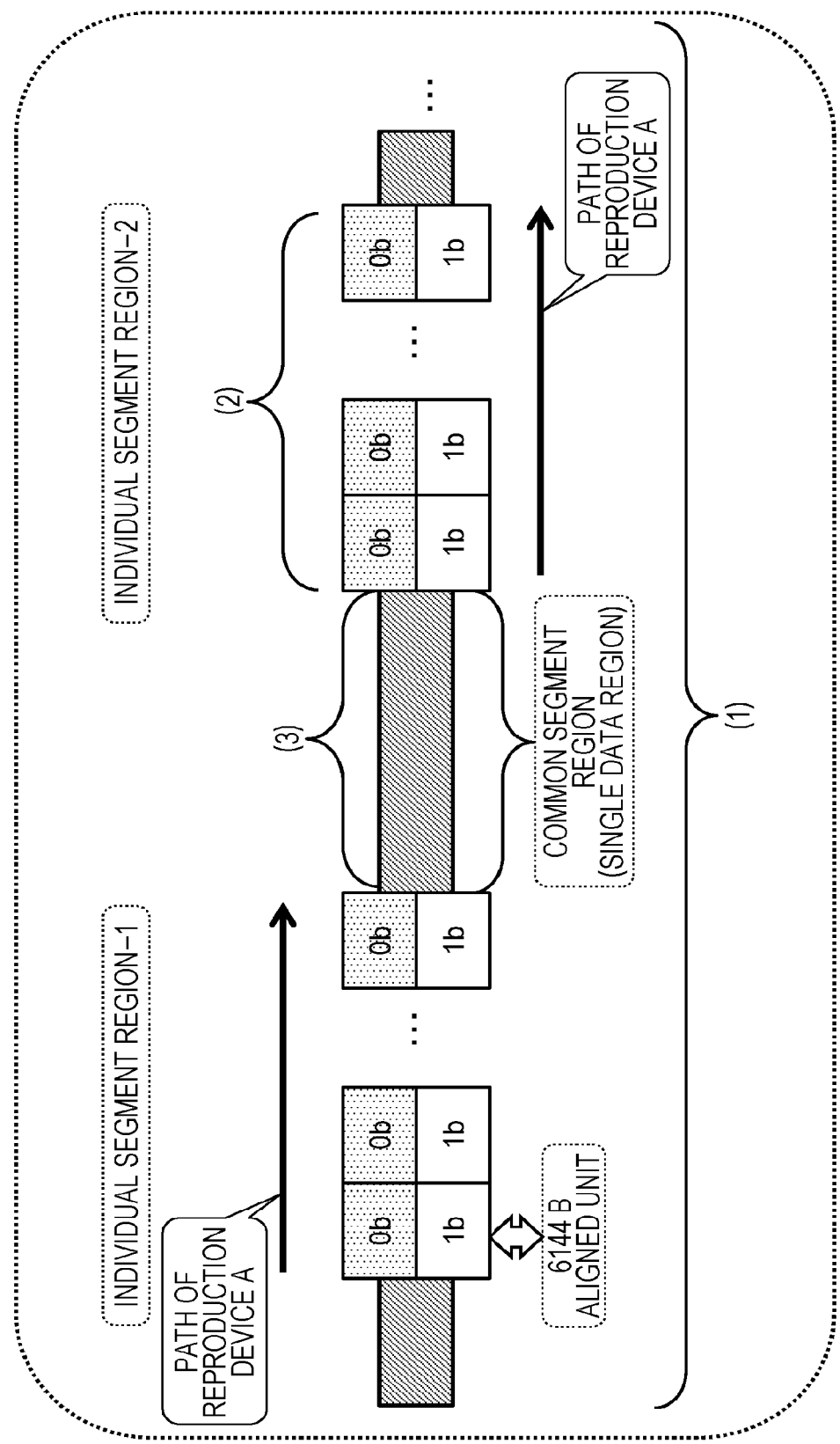

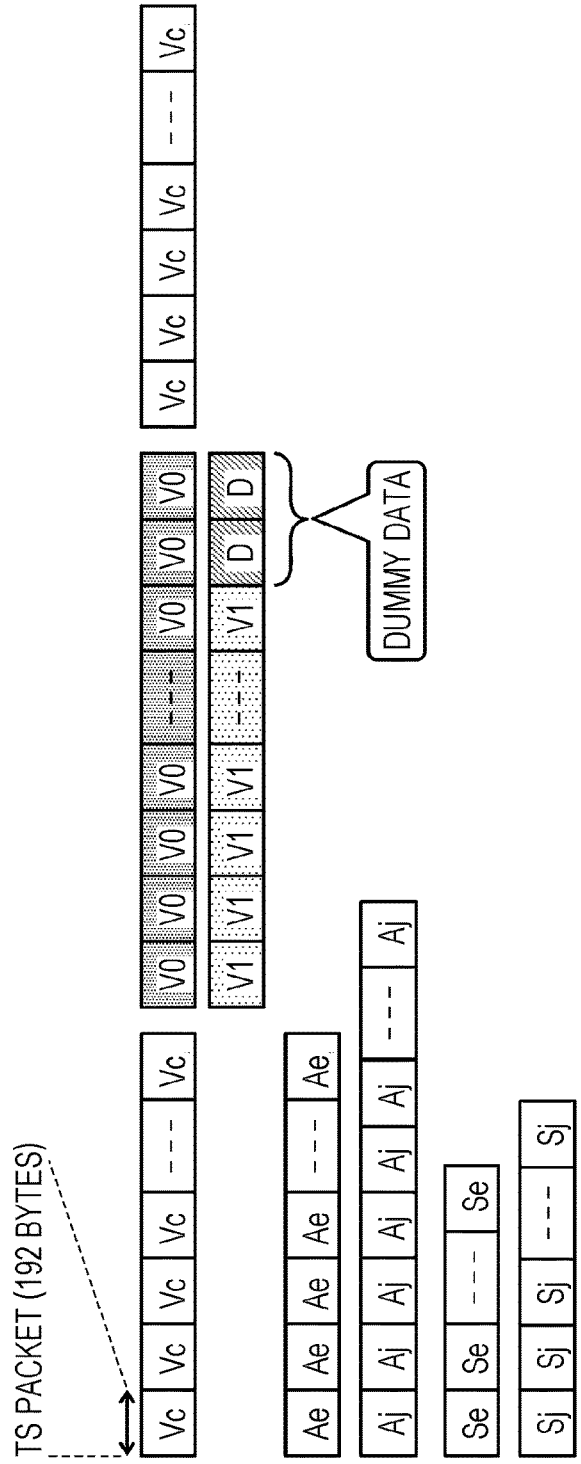
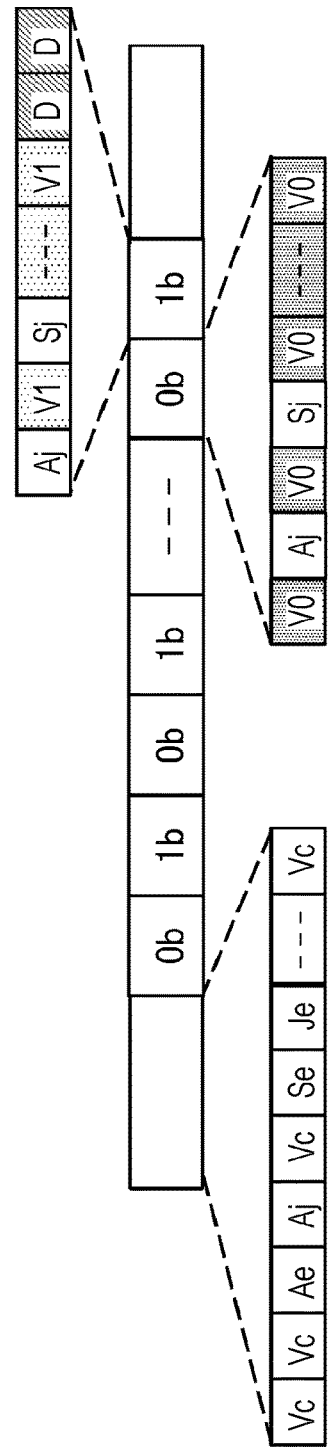
FIG. 13A
FIG. 13B

INFORMATION PROCESSING DEVICE, INFORMATION RECORDING MEDIUM, INFORMATION PROCESSING METHOD, AND PROGRAM

CROSS-REFERENCE TO RELATED APPLICATION

This application claims the benefit of priority of Provisional Application Ser. No. 62/085,453, filed Nov. 28, 2014, the entire contents of which is incorporated herein by reference.

BACKGROUND

The present disclosure relates to an information processing device, an information processing method, and a program, and specifically, it relates to an information processing device, an information recording medium, an information processing method, and a program capable of tracking the source of illegally distributed content.

A digital versatile disc (DVD) and a BLU-ray® Disc (BD) are widely used as an information recording medium (media) in which various contents such as a movie or music are recorded.

The copyright or the distribution right of many contents such as the image data or the music data recorded in these information recording media is possessed by an author or a seller. Therefore, in a case where such content is stored in the information recording medium (media) and supplied to users, generally, a control of use is performed such that only a user having a legitimate right of use is allowed to use the content.

Specifically, for example, a control is performed, in which the content is recorded as an encrypted content, and the content can be decrypted only by an encryption key that was provided to a user who made the legitimate purchasing process for the content. However, even if such a processing is performed, for example, if the user that acquired the encrypted content performs unauthorized processing to distribute or disclose the decrypted content or the encryption key to the public, illegal use of the content by an unspecified number of users occurs. Particularly, in recent years, there have been many cases of performance of illegal disclosure and delivery of the data via a network, and how to prevent such an illegal activity has become a major issue.

As one measure to prevent the illegal distribution of the content, there is a configuration that enables identification of a device which performed the decryption processing based on the decrypted content (plain text).

This is a configuration in which the device that performed the decryption processing can be identified based on identification data extracted from an image by analyzing the decrypted content generated by decrypting the encrypted content, for example, the decrypted image data.

The configuration enabling this source tracking is disclosed in Japanese Unexamined Patent Application Publication No. 2006-236121 and Japanese Unexamined Patent Application Publication No. 2007-43336.

The configurations disclosed in the above Patent Literature are configurations in which a segment that is configuring data of the content, for example, an image of a certain scene that configures the image content is set as a plurality of variation data that can be decrypted by different keys. Each reproduction device selects one data that can be decrypted from the plurality of variation data by applying a unique key which is stored in the reproduction device, and decrypts the data to reproduce. A reproduction device in which a different key is stored decrypts the image of the same scene using a different variation data and reproduces the decrypted data. In this way, different variation data is selected by each reproduction device and then the content is reproduced. That is, the reproduction processing is performed according to a reproduction path that is different depending on the reproduction device.

For example, in a case where copied data of the decrypted content is distributed via a network, by analyzing the variation data or the reproduction path included in the content, the device that decrypted the content can be identified to a certain range.

The encryption keys (decryption keys) stored in the reproduction device are different depending on the manufacturer of the device, and thus, it is possible to track the source (of illegal distribution) according to these units of setting.

However, for example, in a case where a movie content having the variation data is stored on a disc, it is necessary to record a plurality of images of the same scene that configures the variation data on the disc.

This causes a problem that a capacity of the data to be recorded on the disc increases.

Furthermore, in the reproduction processing, it is necessary to select one data from the image of the same scene recorded on the disc to reproduce, and thus, in the reproduction processing, it becomes necessary to perform the reproduction processing with a jump of a predetermined distance instead of the reproduction by continuous reading of the data recorded on the disc.

When the reproduction with the jump is performed as described above, the possibility that pauses in the reproduced image may occur increases.

In order to avoid the pauses in the reproduced image, it is necessary to perform processing of determining the arrangement of recorded data on the disc while considering the necessary jump time. However, since the data arrangement depends on the data length or the number of the variation data, there is a problem in that the difficulty in determining this data arrangement increases.

SUMMARY

The present disclosure, for example, is derived considering the above-described problem and the object thereof is to provide an information processing device which performs the recording and reproduction of such content, an information recording medium in which content is recorded, an information processing method, and a program which realize a recording configuration of content that enables tracking of a source without a pause in reproduction occurring due to the reproduction device.

According to a first embodiment of the present disclosure, there is provided an information processing device that includes a data processing unit that executes reproduction processing of content recorded in an information recording medium. The content includes an individual segment region formed of a plurality of variation data in which identification information different from each other is embedded and each of which can be decrypted by a different key, and a common segment region formed of single data. The variation data is formed of a 6144 byte aligned unit. The data processing unit calculates a reproduction path by applying a device key held in a memory, and selects an aligned unit corresponding to one variation data that corresponds to the calculated reproduction path from a plurality of aligned units configuring a plurality of variation data in the individual segment region included in the data read from the information recording medium, and then, executes the decryption and reproduction processing.

According to a second embodiment of the present disclosure, there is provided an information recording medium that stores content including an individual segment region formed of a plurality of variation data in which identification information different from each other is embedded and each of which can be decrypted by a different key and a common segment region formed of single data, as recorded data. The variation data is formed of a 6144 byte aligned unit. The information recording medium enables a reproduction device to calculate a reproduction path by applying a device key held in a memory, and to select an aligned unit corresponding to one variation data that corresponds to the calculated reproduction path from a plurality of aligned units configuring a plurality of variation data in the individual segment region included in the data read from the information recording medium, and then, to execute the decryption and reproduction processing.

According to a third embodiment of the present disclosure, there is provided an information processing method executing the processing in an information processing device. The information processing device includes a data processing unit that executes reproduction processing of content. The content includes an individual segment region formed of a plurality of variation data in which identification information different from each other is embedded and each of which can be decrypted by a different key, and a common segment region formed of single data. The variation data is formed of a 6144 byte aligned unit. The data processing unit calculates a reproduction path by applying a device key held in a memory; and selects an aligned unit corresponding to one variation data that corresponds to the calculated reproduction path from a plurality of aligned units configuring a plurality of variation data in the individual segment region included in the data read from the information recording medium, and then, executes the decryption and reproduction processing.

According to a fourth embodiment of the present disclosure, there is provided a program that causes an information processing device to execute information processing. The information processing device includes a data processing unit that executes reproduction processing of content. The content includes an individual segment region formed of a plurality of variation data in which identification information different from each other is embedded and each of which can be decrypted by a different key, and a common segment region formed of single data. The variation data is formed of a 6144 byte aligned unit. The program causes the data processing unit to execute calculating processing of a reproduction path by applying a device key held in a memory, and to select an aligned unit corresponding to one variation data that corresponds to the calculated reproduction path from a plurality of aligned units configuring a plurality of variation data in the individual segment region included in the data read from the information recording medium, and then, to execute the decryption and reproduction processing.

The program according to the embodiment of the present disclosure is, for example, a program that can be provided in the information processing device or a computer system capable of executing a variety of program codes using a storage medium or a communication medium in a computer-readable format. By providing such a program in a computer-readable format, the processing corresponding to the program is realized in the information processing device or the computer system.

Additional objects, characteristics, or advantages of embodiments of the present disclosure will become apparent from the following detailed description based on the embodiments of the present disclosure described below and the drawings attached hereto. The system in the present Description means the logical combination of a plurality of devices, and the devices are not limited to being disposed in the same housing.

According to a configuration in the embodiment of the present disclosure, a source analysis of the copied content is realized using content that includes segment regions having a plurality of variation data in which identification information items different from each other are embedded, and thus, normal reproduction without pauses occurring is realized in the reproduction device.

Specifically, content including an individual segment region formed of a plurality of variation data in which identification information different from each other is embedded and each of which can be decrypted by a different key and a common segment region, is used. The variation data is formed of a 6144 byte aligned unit. The reproduction device calculates a reproduction path by applying a device key, and selects an aligned unit corresponding to the reproduction path from the aligned units configuring a plurality of variation data in the individual segment region, and then, executes the decryption and reproduction processing.

According to this configuration, the source analysis of the copied content is realized by using the content including the individual segment region formed of a plurality of variation data in which identification information different from each other is embedded, normal reproduction without pauses occurring is realized in the reproduction device.

The effects described herein are merely examples and are not limited thereto, and there may be additional effects.

BRIEF DESCRIPTION OF THE DRAWINGS

FIGS. 1A and 1B are diagrams illustrating a configuration example of content having individual segment regions and common segment regions;

FIGS. 9A and 9B are diagrams illustrating a configuration example of the content having individual segment regions and common segment regions and an example of recording the data on the disc;

FIG. 10 is a diagram illustrating a configuration example of content having individual segment regions and common segment regions;

FIGS. 13A and 13B are diagrams illustrating a specific configuration example of the content having individual segment regions and common segment regions;

DETAILED DESCRIPTION OF EMBODIMENTS

Figure 2:
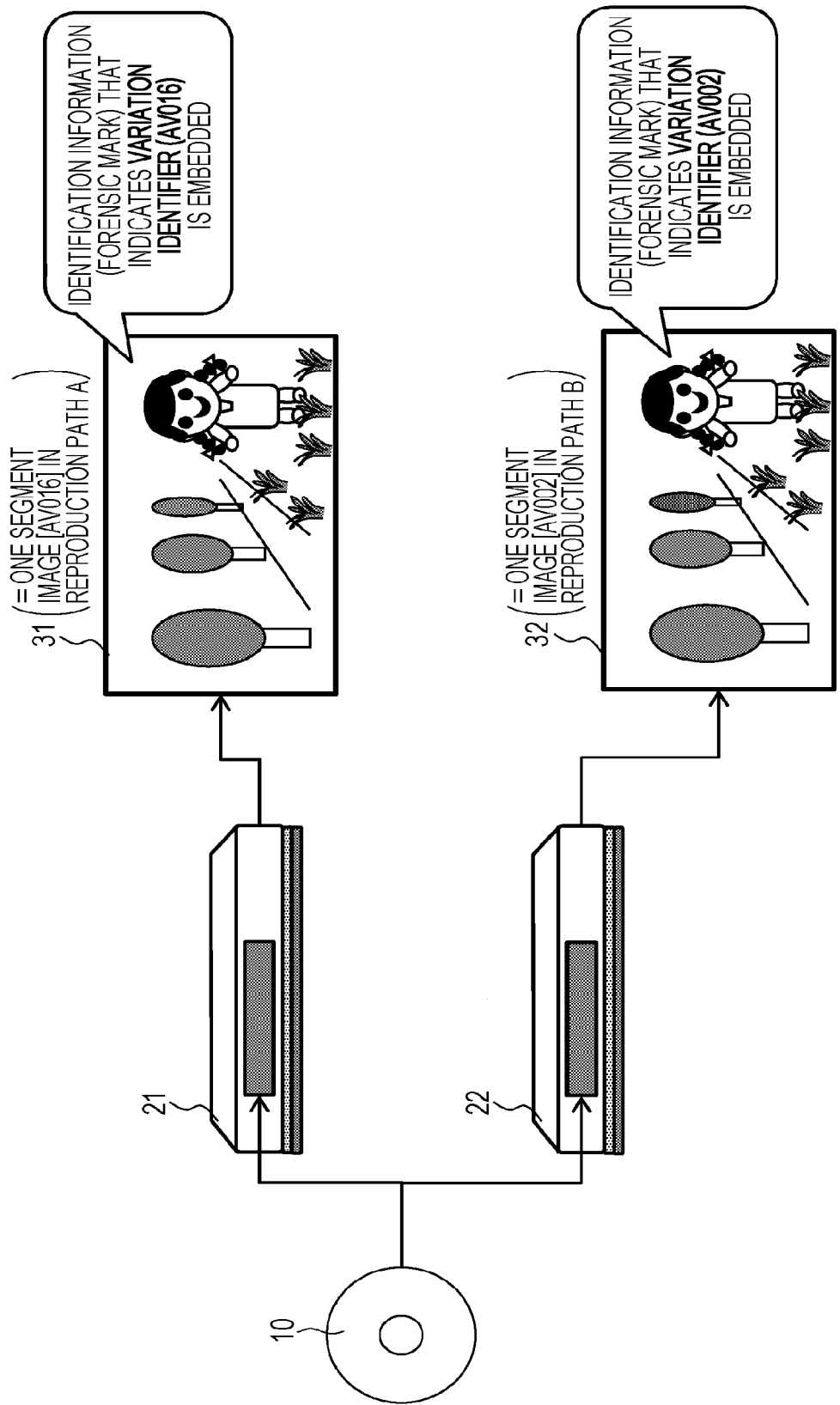
FIG. 2 is a diagram illustrating an example of detecting identification information from configuration data of the content having individual segment regions and common segment regions.

Hereinafter, an information processing device, an information recording medium, an information processing method, and program will be described in detail with reference to the drawings. The description will be performed in accordance with the following.

1. Overview of source tracking processing based on a reproduction path analysis
2. An example of reproduction processing in the reproduction device
3. Problems in reproduction of the individual segment regions
4. Example of setting individual segment region data (variation data) in units of aligned units
 4-1. Configuration example of data recorded on a disc
 4-2. Embodiment of setting the variation data in units of the aligned unit
5. Specific example of a data configuration of the individual segment region
 5-1. Configuration example 1 of the recorded data
 5-2. Configuration example 2 of the recorded data
6. Data size of the common segment region
7. Configuration example of a segment key file
8. Example of data reproduction processing executed by the reproduction device 8-1. (Example 1 of data reproduction processing) Example of data reproduction processing in which filtering processing is executed by a filter processing unit and only the data according to a reproduction path is selectively acquired and reproduced 8-2. (Example 2 of data reproduction processing) Example of data reproduction processing in which only the data that can be decrypted is decrypted in the decryption unit and the data according to the reproduction path is generated and reproduced 8-3. (Example 3 of data reproduction processing) In a separation unit (a demultiplexer), only the data according to the reproduction path is selectively acquired from the decryption result and reproduced 9. Example of recording processing of a digital watermark with respect to content and manufacturing processing of a disc
10. Hardware configuration example of the information processing device
11. Summary of the configuration in the present disclosure 1. Overview of Source Tracking Processing Based on a Reproduction Path Analysis First, an overview of source tracking processing based on a reproduction path analysis will be described.

An example of setting the reproduction path of content according to a reproduction device with reference to FIG. 1 will be described.

FIG. 1 illustrates a configuration example of reproduction data recorded on a disc on which content such as movies is stored, and a data stream that is selected by each reproduction device in a case where the reproduction of the content is performed, that is, the reproduction path.

In FIG. 1, two reproduction paths are illustrated as follows.

(1) Reproduction path A of a reproduction device A
(2) Reproduction path B of a reproduction device B Each of AV00 to AV255 illustrated in FIGS. 1A and 1B is reproduction data of content such as a movie, specifically is image data formed of, for example, approximately image frames of a few seconds. The reproduction data is arranged from the left to the right, and the reproduction device performs the reproduction from AV000 to AV255.

However, in individual segment regions (individual segments 1 to 15), a plurality of image data for the same scene are set. For example, in the individual segment 1, 16 image data AV001 to AV016 are set.

These are image data for the same scene, but the 16 image data AV001 to AV016 are encrypted by keys (segment keys) different from each other.

The data encrypted by the different encryption keys set in the individual segment region are called variation data.

Each reproduction device can acquire a segment key from a segment key file stored on the disc along with the content using a key (device key) stored in this device.

However, the number of segment keys acquirable using the device key stored on one reproduction device is only one segment key with respect to each individual segment region.

That is, each reproduction device can acquire the segment key that can decrypt one variation data among the plurality of variation data (for example, AV001 to AV016) in each individual segment region (for example, individual segment 1).

A combination of the segment keys that can be acquired from the segment key file is set differently according to the device key stored in the reproduction device.

The reproduction device selects and decrypts one variation data that can be decrypted from one individual segment region using the segment key acquired from the segment key file, and reproduces the decrypted data.

Sections in which only one data is set other than the individual segment regions are called single data regions or common segment regions. For example, in the reproduction sections AV000, AV017, and the like, only one data is set, and thus every reproduction device reproduces only this one data.

Here, the data in the single data region is also the encrypted data.

These data can be decrypted by applying a CPS unit key (also referred to as a title key) that can be acquired from a CPS unit key file stored on the disc on which the content is stored.

The reproduction device acquires the CPS unit key from the CPS unit key file by the processing by which the device key stored in the reproduction device and the data stored on the disc are applied.

In the example illustrated in FIG. 1, fifteen individual segment regions (individual segments 1 to 15) are set in the content.

In addition, in each of individual segments 1 to 15, the data (variation data that can be decrypted by different keys) encrypted by sixteen different keys (segment keys) are set respectively. Each of the plurality of data that can be decrypted by the different keys set in the individual segment regions are called variation data.

The keys for the decryption of the variation data are the segment keys. The segment key can be acquired from, for example, the segment key file stored on the disc along with the content subject to the reproduction.

However, the segment keys stored in the segment key file are individually encrypted, and thus, the reproduction device can acquire a part of segment keys by the decryption processing using the device key or the like stored in the reproduction device.

The segment key that can be acquired by one reproduction device is a key that can decrypt only one variation data among the plurality of variation data set in the individual segment region.

The reproduction device, with regard to each of the individual segment regions, sequentially acquires the segment key that can be acquired from the segment key file, and decrypts one variation data using the acquired segment key and performs the reproduction processing.

As described above, each reproduction device selects one variation data that can be decrypted from one individual segment region and performs the reproduction processing.

The reproduction device in which a different device key is stored performs the reproduction processing according to a different reproduction path.

The example illustrated in FIG. 1A indicates the reproduction path of the reproduction device A.

The reproduction device A sequentially reproduces each of the following data.

AV000→[AV016]→AV017 →[AV019]→AV034→[AV035] . . . →AV238→[AV240]→AV255

This is the reproduction path A of the reproduction device A.

Among the reproduction data described above, the data shown enclosed in [ ] such as [AVxxx] are the variation data set in individual segment regions.

The reproduction device A decrypts the encrypted segment keys stored in the segment key file from the sixteen variation data (encrypted data) set in the individual segment region using the key (device key) possessed by the user of the reproduction device A, and then acquires the segment key.

By applying the acquired segment keys, the reproduction device A selects the variation data that can be decrypted and performs the reproduction.

The data that are not enclosed in [ ] are not the data in the individual segment regions, and are commonly reproduced by all the reproduction devices.

On the other hand, a reproduction device B illustrated in FIG. 1B sequentially reproduces each of the following data.

AV000→[AV002]→AV017→[AV020]→AV034→[AV050] . . . →AV238→[AV239]→AV255

This is the reproduction path B of the reproduction device B.

Among the reproduction data described above, the data shown enclosed in [ ] such as [AVxxx] are the variation data.

The reproduction device B acquires a part of segment keys from the segment key file using the device key stored in the reproduction device B.

Furthermore, by applying the acquired segment key, the reproduction device B selects one variation data that can be decrypted from the sixteen variation data (encrypted data) set in the individual segment regions, and performs the reproduction.

The data that are not enclosed in [ ] are not data in individual segment regions, and are commonly reproduced by all the reproduction devices.

Comparing the reproduction path A of the reproduction device A and the reproduction path B of the reproduction device B, the reproduction data in the single data regions other than in the individual segment regions are common. However, the variation data reproduced in the individual segment regions are different from each other.

This is because the device keys stored in the reproduction device A and the reproduction device B are different from each other, and thus, the combinations of the segment keys that can be acquired from the segment key files are different from each other.

In the variation data set in the individual segment regions in each reproduction path, an identifier that identifies which variation data will be reproduced, for example, a data identifier such as [AVxxx] is embedded. The identifier is embedded by a technology such as a watermark (WM).

That is, by analyzing the reproduction image data, it is possible to determine which variation data will be reproduced.

The reproduction image data reproduced by each reproduction device and image analysis processing with respect to the reproduction image data will be described with reference to FIG. 2.

Content formed of the individual segment regions and the single data regions described in FIG. 1 is stored on an information recording medium (disc) 10 illustrated in FIG. 2.

The reproduction device A 21 executes the content reproduction according to the reproduction path A described with reference to FIG. 1A.

The reproduction device B 21 executes the content reproduction according to the reproduction path B described with reference to FIG. 1B.

A reproduction image A 31 is variation data selected from one individual segment region, and is variation data [AV016] included in the reproduction path A.

A reproduction image B 32 is another variation data selected from the same individual segment region, and is variation data [AV002] included in the reproduction path B.

Any of these two reproduction images A and B is, for example, an image of the same scene of movie content, and the viewer can view these without distinguishing therebetween.

However, the reproduction image A 31 is the variation data [AV016] included in the reproduction path A, and in the reproduction image A 31, identification information (a data identifier) indicating the variation data [AV016] is embedded. For example, the identifier can be analyzed by the analysis processing of the watermark.

The identification information embedded in the reproduction data as above is called a forensic mark or forensic water mark.

On the other hand, the reproduction image B 32 is the variation data [AV002] included in the reproduction path B, and in the reproduction image B 32, identification information (the data identifier) indicating the variation data [AV002] is embedded.

In the content illustrated FIG. 1, fifteen individual segment regions (individual segments 1 to 15) are set.

For example, in a case where illegally distributed content is detected on a network, if it is determined from which variation data the reproduction images in the fifteen individual segment regions included in this illegally distributed content are reproduced, the reproduction path of the content is revealed.

For example, if the content illegally distributed is from the reproduction path A illustrated in FIG. 1, the original data of this copied content is the content decrypted by the reproduction device A illustrated in FIG. 2, and it is possible to determine that the source of the illegally copied content is the reproduction device A.

In addition, for example, if the copied content illegally distributed is from the reproduction path B illustrated in FIG. 1, the original data of this copied content is the content decrypted by the reproduction device B illustrated in FIG. 2, and it is possible to determine that the source of the illegally copied content is the reproduction device B.

A specific example of source tracking processing based on the data of the individual segment regions will be described with reference to FIG. 3.

Figure 3:
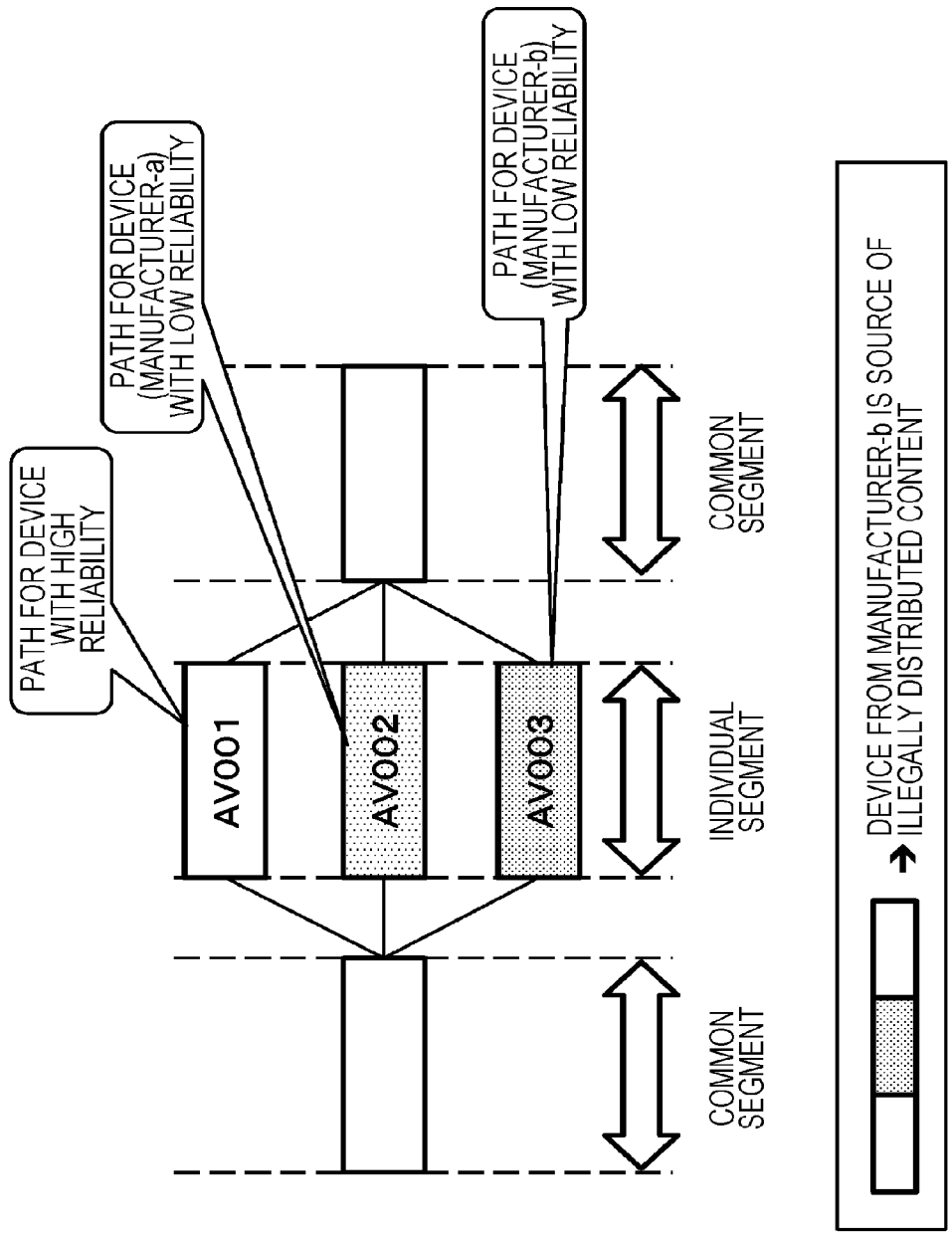
FIG. 3 is a diagram illustrating an example of source identification processing of the illegally distributed content based on the identification information of the individual segment regions.

In FIG. 3, three regions such as a common segment region, an individual segment region, and a common segment region are illustrated as a part of the regions of the content configuration data.

For example, one variation data [AV001] in the individual segment region is assumed to be decrypted by segment keys that are held in reproduction devices manufactured by a plurality of manufacturers A, B, and C having high reliability.

In addition, one variation data [AV002] in the individual segment region is assumed to be decrypted by a segment key that is held in a reproduction device manufactured by a specific manufacturer P having low reliability.

In addition, one variation data [AV003] in the individual segment region is assumed to be decrypted by a segment key that is held in a reproduction device manufactured by another specific manufacturer Q having low reliability.

In a case of configuration like this, in a case where one variation data [AV002] in the individual segment region is detected from the illegally distributed content, it is possible to determine that the original source of the illegally distributed content is the reproduction device manufactured by the specific manufacturer P.

Similarly, in a case where one variation data [AV003] in the individual segment region is detected from the illegally distributed content, it is possible to determine that the original source of the illegally distributed content is the reproduction device manufactured by the specific manufacturer Q.

2. An Example of Reproduction Processing in the Reproduction Device

Next, the recording processing of the content having the above-described setting and the sequence of the content reproduction processing will be described with reference to FIG. 4.

Figure 4:
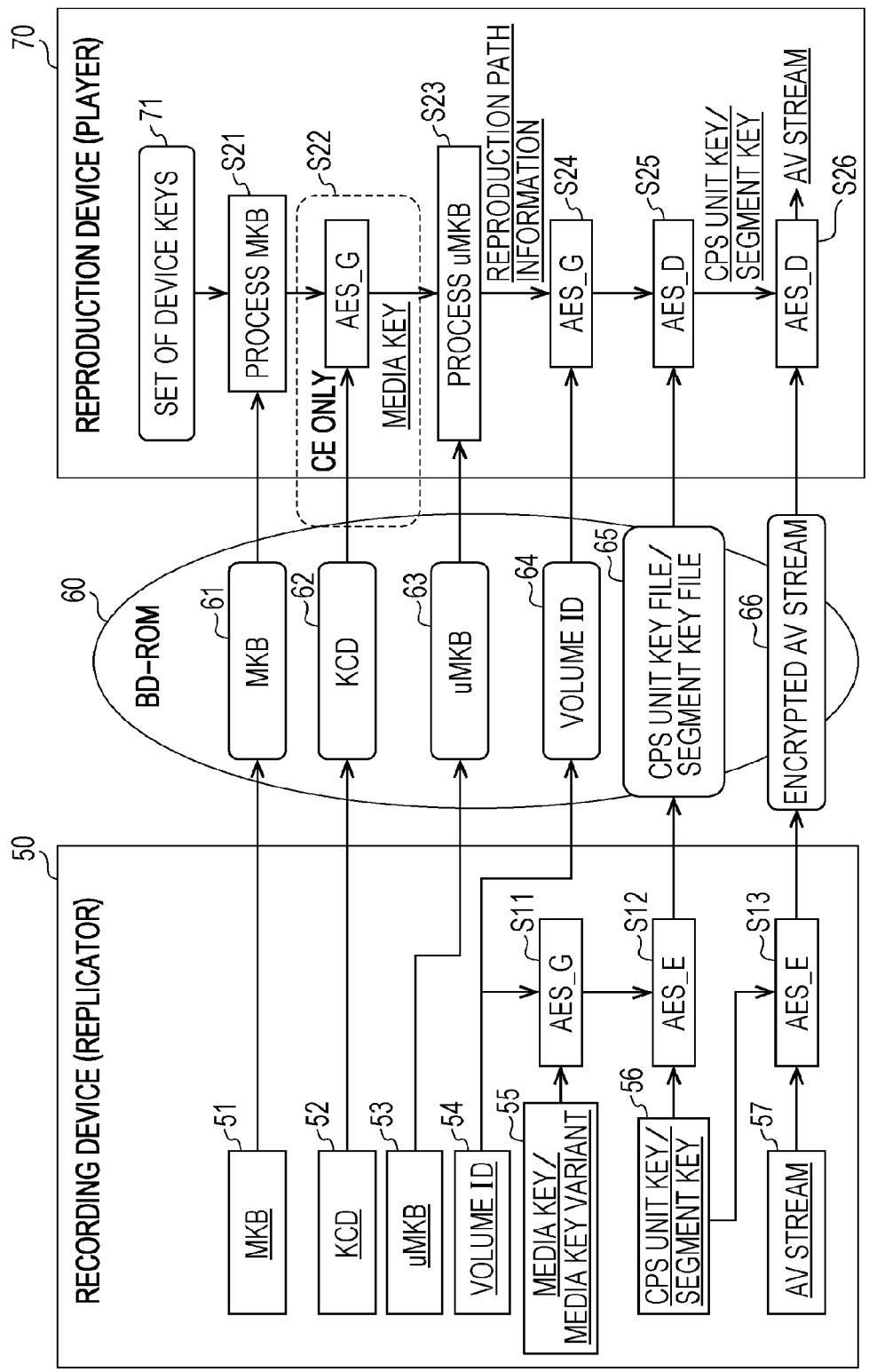
FIG. 4 is a diagram illustrating an example of recording and reproduction processing of the content having individual segment regions and common segment regions.

In FIG. 4, a recording device (replicator) 50, an information recording medium (disc (BD-ROM)) 60, and a reproduction device (player) 70 are illustrated from the left.

First, the content recording processing executed by the recording device (replicator) 50 will be described.

The recording device 50 records each of the following data in the information recording medium 60.

an MKB (media key block) 51,
KCD (key conversion data) 52,
a uMKB (unified-media key block) 53, and
a volume ID 54.

The MKB (media key block) 51, KCD (key conversion data) 52, and uMKB (unified-media key block) 53 are formed of data such as keys used for obtaining unique reproduction path information of a reproduction device 70 by the processing of applying a device key set 71 held in the reproduction device.

The volume ID 54 is, for example, an identifier set corresponding to content that corresponds to a specific title, and is data applied for calculating the segment key and the CPS unit key in the reproduction device 70.

In STEP S11, the recording device 50 generates the encryption key of the CPS unit key file in which the CPS unit key that is applied to the decryption of the common segment regions is stored and the encryption key that is applied to the decryption of the segment key file in which the segment key that is applied to the decryption of the individual segment regions is stored.

The AES_G, AES_E, and AES_D illustrated in the figure respectively indicate data (random number or the like) generation processing, encryption processing, and decryption processing according to the AES encryption algorithm.

The encryption key of the CPS unit key file is generated by the volume ID 54 and a media key 55-1. The encryption key of the segment key file is generated using the volume ID 54 and a media key variant 55-2.

In the segment key file in which the segment key is stored, the keys corresponding to all the variation data set in each of the individual segment regions are stored as the encrypted data. The media key variant 55-2 is data that is different corresponding to each variation data, and the encryption keys which are different from each other are generated for applying to each segment key using a media key variant 55-2.

In STEP S12, the recording device 50 executes the encryption of the CPS unit key file 56-1 and the encryption of the segment key file 56-2, and then, records the encrypted files in the information recording medium 60.

Furthermore, in STEP S13, for example, with respect to an AV stream 57 formed of content such as a movie, the recording device 50 executes the encryption processing of the common segment regions and the individual segment regions respectively by applying the CPS unit key obtained from the CPS unit key file 56-1 and the segment key obtained from the segment key file 56-2, and then, generates the encrypted content (encrypted AV stream) and records the content in the information recording medium 60.

Each of the following data is recorded in the information recording medium 60.

an MKB (media key block) 61,

KCD (key conversion data) 62, a uMKB (unified-media key block) 63, a volume ID 64, a CPS unit key file and a segment key file 65, and an encrypted content (encrypted AV stream) 66.

Next, the processing in the reproduction device (player) 70 will be described.

A device key set (set of device keys) 71 unique to the reproduction device is stored in the memory in the reproduction device 70.

The device key set (set of device keys) 71 can be variously set such as setting that are different according to the type or manufacturer of the device, or settings different for each device.

In STEPs S21 to S23, the reproduction device 70 executes the processing tasks using the device key set (set of the device keys) 71 and the data recorded in the information recording medium 60, that is, the MKB (media key block) 61 the KCD (key conversion data) 62, and the uMKB (unified-media key block) 63, and then, obtains the reproduction path information.

The reproduction path information items are different from each other according to the device key set (set of the device keys) 71 held in the reproduction device.

Next, in the STEPs S24 and S25, the reproduction device 70 calculates the keys necessary for decryption of the data of the segment region that is along with the reproduction path information.

That is, the reproduction device 70 calculates the CPS unit key applied to the decryption of the configuration data of the common segment region and the segment key applied to the decryption of one variation data in the individual segment region.

In the calculation of the key, each of the following data obtained from the disc 64 are used.

The volume ID 64, and the CPS unit key file and the segment key file 65.

In the segment key file 65, the segment key that is applied to the decryption of all the variation data included in the individual segment regions is stored in an encrypted manner by a separate encryption key. The number of segment keys that can be obtained (decrypted) by one reproduction device 70 is only one segment key with regard to one individual segment region. That is, only one segment key that is applied to the decryption of one variation data selected according to the reproduction path information can be obtained (decrypted).

This differs according to the device key set 71 stored in the reproduction device 70.

Next, in STEP S26, the reproduction device 70 reads the encrypted content 66 from the disc, and executes the decryption processing by applying the CPS unit key and the segment key, generates the decrypted content (AV stream), and then, executes the reproduction.

In this way, the reproduction device 70 reproduces the content according to the reproduction path unique to the reproduction device.

3. Problems in Reproduction of the Individual Segment Regions

In a case where the content in which the common segment regions and the individual segment regions described with reference to FIG. 1 are set is reproduced, the reproduction device selects one variation data from the individual segment region and reproduces the content.

In a case where this selection and reproduction processing of the variation data is performed, jump processing of the reading header (optical header) that reads the data recorded on the disc is performed if necessary.

That is, jump reproduction processing is performed, in which the position of the reading header is determined to be the position where the variation data recorded area that is subject to be reproduced is positioned and the variation data is reproduced, with jumping the variation data recorded area that is recorded on the disc and that is not subject to be reproduced.

It takes a predetermined time to perform this jump processing of the header, and when the jump processing time becomes longer, the possibility of the reproduction pauses in the reproduced image occurring increases.

Figure 5:
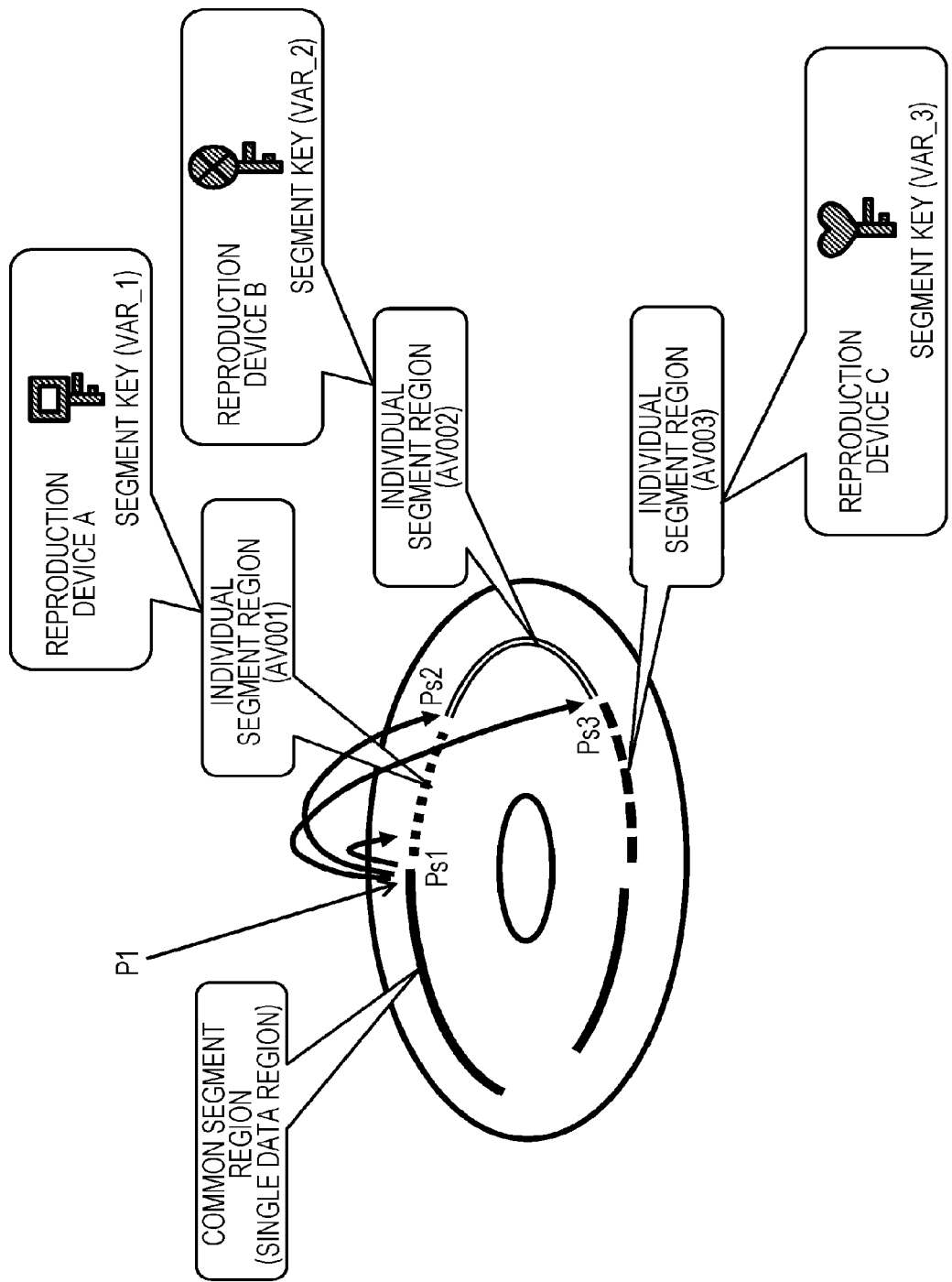
FIG. 5 is a diagram illustrating an example of jump processing necessary for the reproduction of the content having individual segment regions and common segment regions.

A specific example of the jump processing is illustrated FIG. 5. The individual segment region is set subsequently to the common segment region on the disc. A plurality of variation data is recorded in the individual segment region. In the example illustrated in the figure, three variation data (AV001 to AV003) are recorded.

For example, the reproduction path of the reproduction device A is a path that reproduces the variation data (AV001). In this case, the reproduction device A moves to a recording start position Pa1 of the variation data (AV001) from the end position P of the common segment region, and executes the reproduction processing.

The reproduction path of the reproduction device B is a path that reproduces the variation data (AV002). In this case, the reproduction device B moves to a recording start position Pa2 of the variation data (AV002) from the end position P of the common segment region, and executes the reproduction processing.

The reproduction path of the reproduction device C is a path that reproduces the variation data (AV003). In this case, the reproduction device C moves to a recording start position Pa3 of the variation data (AV003) from the end position P of the common segment region, and executes the reproduction processing.

As is apparent from the figure, the jump distance of the reproduction device C is very long. During the jump processing, the reproduction processing of the reproduction data in the common segment region that is stored in the buffer of the reproduction device is executed. However, when the jump execution time becomes long, a case where the jump execution time exceeds the reproduction time of the reproduction data in the common segment region that is stored in the buffer occurs. In this case, pauses in reproduction occur.

This problem occurs more readily as the continuous recording region of one variation data set in one individual segment region on the disc becomes longer.

As described above, in a case where the content in which the common segment regions and the individual segment regions are set is reproduced, the reproduction device has to select one variation data from the individual segment region and reproduce the variation data, and when the jump time becomes long, there is a risk of a delay and pause occurring in the reproduction.

4. Example of Setting Individual Segment Region Data (Variation Data) in Units of Aligned Units As described above, when the recording length of the individual segment region data (variation data) is long, there is problem that a pause in reproduction easily occurs.

Hereinafter, a configuration to solve this problem will be described.

In the description below, an embodiment in which the individual segment regions data (variation data) has an array configuration of multiple aligned units will be described.

The aligned unit is configuration data of a clip AV stream file defined in the MPEG-2TS format.

In the MPEG-2TS format, data such as an image subject to be reproduced is divided into source packets formed of 192 byte data, and is stored.

The aligned unit is 6144 byte data formed of 32 source packets.

4-1. Configuration Example of the Disc Recorded Data

First, configuration examples of the source packets, the aligned units, and the disc recorded data will be described.

The recording format (BDMV format) in a case where the content such as a movie is recorded on a BD (Blu-Ray® Disc) will be described with reference to FIG. 6.

In the BDMV format, data such as an image (video), voice (audio) data, subtitles that are subject to be reproduced are stored in the clip AV stream file to be recorded.

The clip AV stream file is a file set with an 188 byte transport stream (TS) packet as a configuration element. The transport stream packet, that is, the TS packet is arrayed according to the MPEG-2TS (transport stream) format.

The MPEG-2TS format is a standardized format in ISO 13818-1, and is used for the data recording to the BD (Blu-Ray® Disc) or digital broadcasting, for example.

The coded data of the image, the audio, or the still image that are allowed to be stored according to the MPEG-2TS format are, for example, the coded data described below.

Images: MPEG-1, MPEG-2, AVC (MPEG-4AVC), and HEVC (MPEG-4HEVC)

Audio: MP1, MP2, MP3, linear PCM, and DTS

Still images: JPEG

For example, each of above coded data is distributed across the transport stream (TS) defined in the MPEG-2TS, and is stored.

Figure 6:
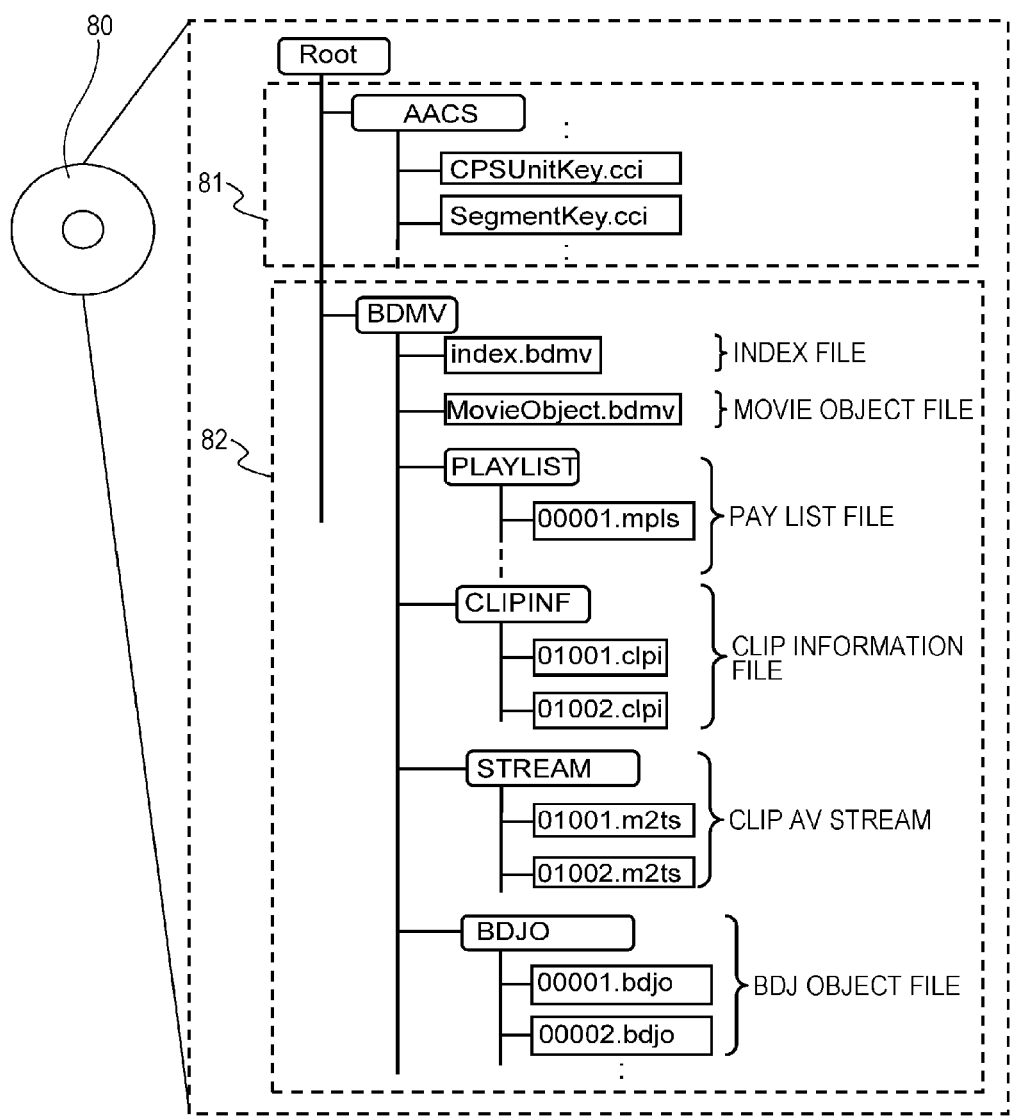
FIG. 6 is a diagram illustrating an example of a directory configuration of data recorded on a medium according to a BDMV format.

FIG. 6 is a diagram illustrating a directory of the recorded data according to the BDMV format recorded on an information recording medium (media) 80 which is a ROM type BD (Blu-Ray® Disc).

As illustrated in FIG. 6, the directory is separated into a management information setting unit 81 (AACS directory) and a data unit 82 (BDMV directory).

In the management information setting unit 81 (AACS directory), the CPS unit key file that is the data encryption key, the segment key file, and a usage control information file are stored.

In the CPS unit key file, the CPS unit key that is applied to the decryption of the encrypted data set in the common segment regions (single data regions) other than the individual segment region illustrated in FIG. 1 is stored as the encryption key data.

The reproduction device can acquire the CPS unit key from the CPS unit key file by the processing of applying the device key stored in the reproduction device and the data stored on the disc.

In the segment key file, the segment key that is applied to the decryption of the variation data set in the individual segment region illustrated in FIG. 1 is stored as the encryption key data.

The reproduction device can acquire the segment key from the segment key file by the processing of applying the device key stored in the reproduction device and the data stored on the disc.

However, as described above, the number of segment key that can be acquired from the segment key file using the device key stored in one reproduction device is only one segment key with respect to each individual segment region.

That is, only one segment key can be acquired for the decryption of one variation data among the plurality of variation data set in the individual segment region.

The combination of the segment keys that can be acquired from the segment key file is differently set according to the device key stored in the reproduction device.

According to this setting, the reproduction path corresponding to the reproduction device is set.

The details of the processing of acquiring the CPS unit key from the CPS unit key file and the processing of acquiring the segment key from the segment key file are disclosed in PTL 1 (Japanese Patent Application Publication No. 2006-236121) which is the prior application to this application. In the processing of the present disclosure described below also, the processing of acquiring the CPS unit key and the segment key is executed by the processing similar to that in the above Patent Literature.

On the other hand, for example, the following files are recorded in the directories below the BDMV directory of the data unit 82.

Those are:

an index file, a playlist file, a clip information file, a clip AV stream file, and a BDJO file.

Title information applied to the reproduction processing is stored in the index file as index information.

The playlist file is a file that regulates the order of the content reproduction according to program information in the reproduction program designated by the title, and has designation information with respect to the clip information having the reproduction position information.

The clip information file is a file designated by the playlist file, and has reproduction position information of the clip AV stream file.

The clip AV stream file is file in which the AV stream data subject to be reproduced is stored.

The BDJO file is a file in which execution control information of the files storing JAVA® program, command, and like are stored.

The sequence in which the information processing device reproduces the content recorded in the information recording medium is as follows.

(a) First, designate a specific title from an index file by a reproduction application.

(b) A reproduction program associated with the designated title is selected.

(c) A playlist that regulates the content reproduction order or the like is selected according to the program information of the selected reproduction program.

(d) The Av stream or the command is read as the data of real content by the clip information defined in the selected playlist, and the reproduction of the AV stream or the execution of the command is performed.

Figure 7:
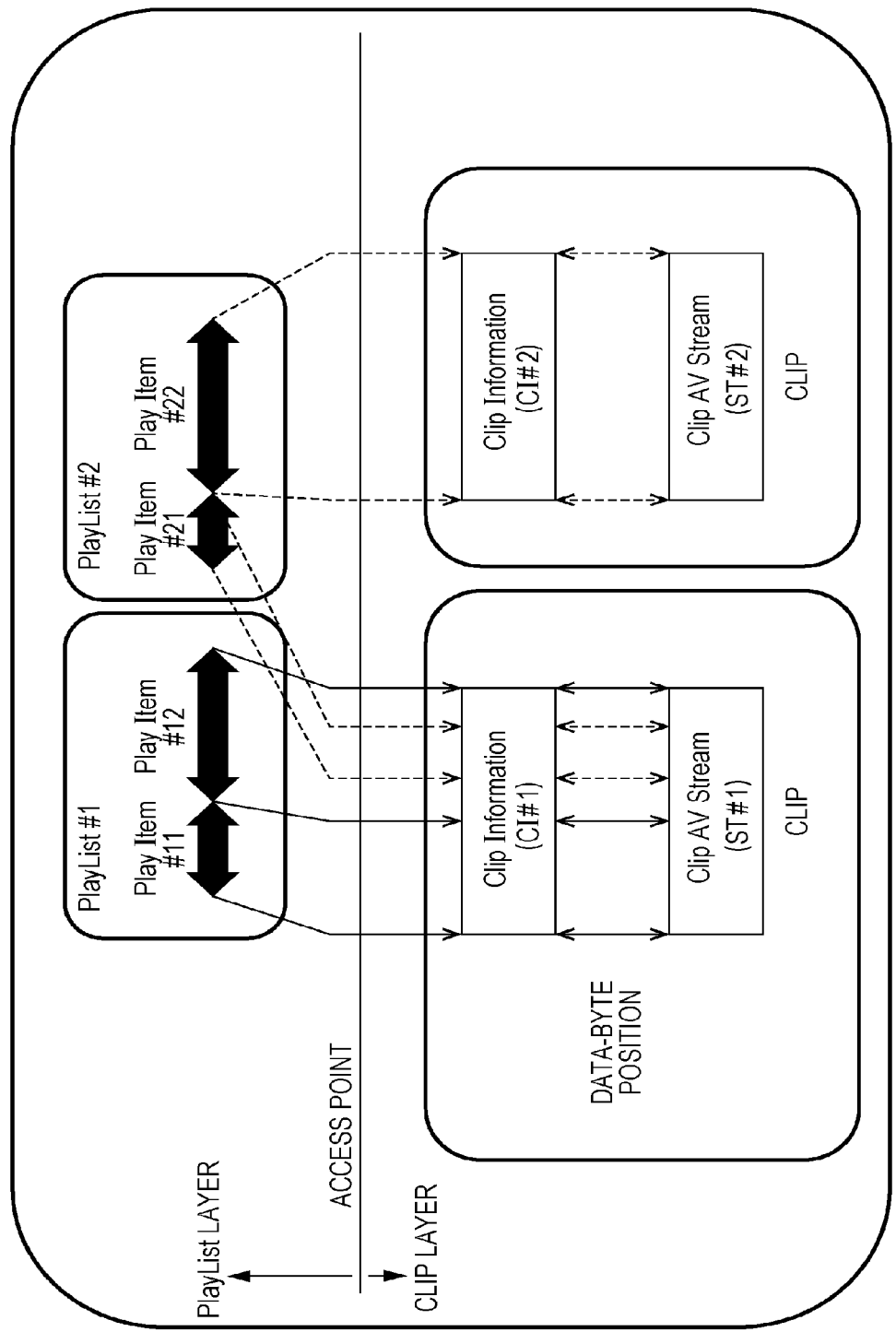
FIG. 7 is a diagram illustrating a correspondence between a playlist and the reproduction data defined in the BDMV format.

FIG. 7 is a diagram illustrating a correspondence relationship between the following data recorded in the information recording medium (media) 80, those are:

the playlist file, the clip information file, and the clip AV stream file.

The AV stream formed of the image and the audio data that are the actual reproduction data is recorded as a clip AV stream file, and then, a playlist file and the clip information file are defined as management information of this AV stream and a reproduction control information file.

As illustrated in FIG. 7, these plural categories of files can be classified into following two layers:
a playlist layer that includes the playlist file, and
a clip layer that is form of the clip AV stream file and the clip information file.

One clip information file is associated with one clip AV stream file, and considering the above pair as one object, those are collectively referred to as a clip or a clip file.

Detail information of the data included in the clip AV stream file, for example, management information of an EP map in which I picture position information of the MPEG data is recorded is recorded in the clip information file.

The clip AV stream file stores the data in which the MPEG-2TS (transport stream) is disposed according to the defined structure of the BDMV format. The details of this configuration will be described below with reference to FIG. 8.

In addition, the clip information file stores management information for acquiring the reproduction start position of the data stored in the clip AV stream file such as correspondence data between the data position of the byte sequence data of the clip AV stream file and the reproduction time position that is the reproduction start point (entry point: EP) in a case deploying on the time axis.

The playlist includes information indicating an access point corresponding to the reproduction start position or the reproduction end position of the clip by a timestamp that is information on the time axis.

For example, it is possible to acquire an address as the data reading position of the clip AV stream file, that is, the reproduction start point based on the timestamp indicating the reproduction time passed position from the start point of the content referring to the clip information file.

The clip information file is used for finding the information of the address where the stream decoding is started in the clip AV stream file from the timestamp.

As described above, the playlist file includes designation information of the reproduction section with respect to the reproducible data included in the clip (clip information file+clip AV stream file) layer.

In the playlist file, one or more play items are set, and each play item includes designation information of the reproduction section with respect to the reproducible data included in the clip (clip information file+clip AV stream file) layer.

Figure 8:
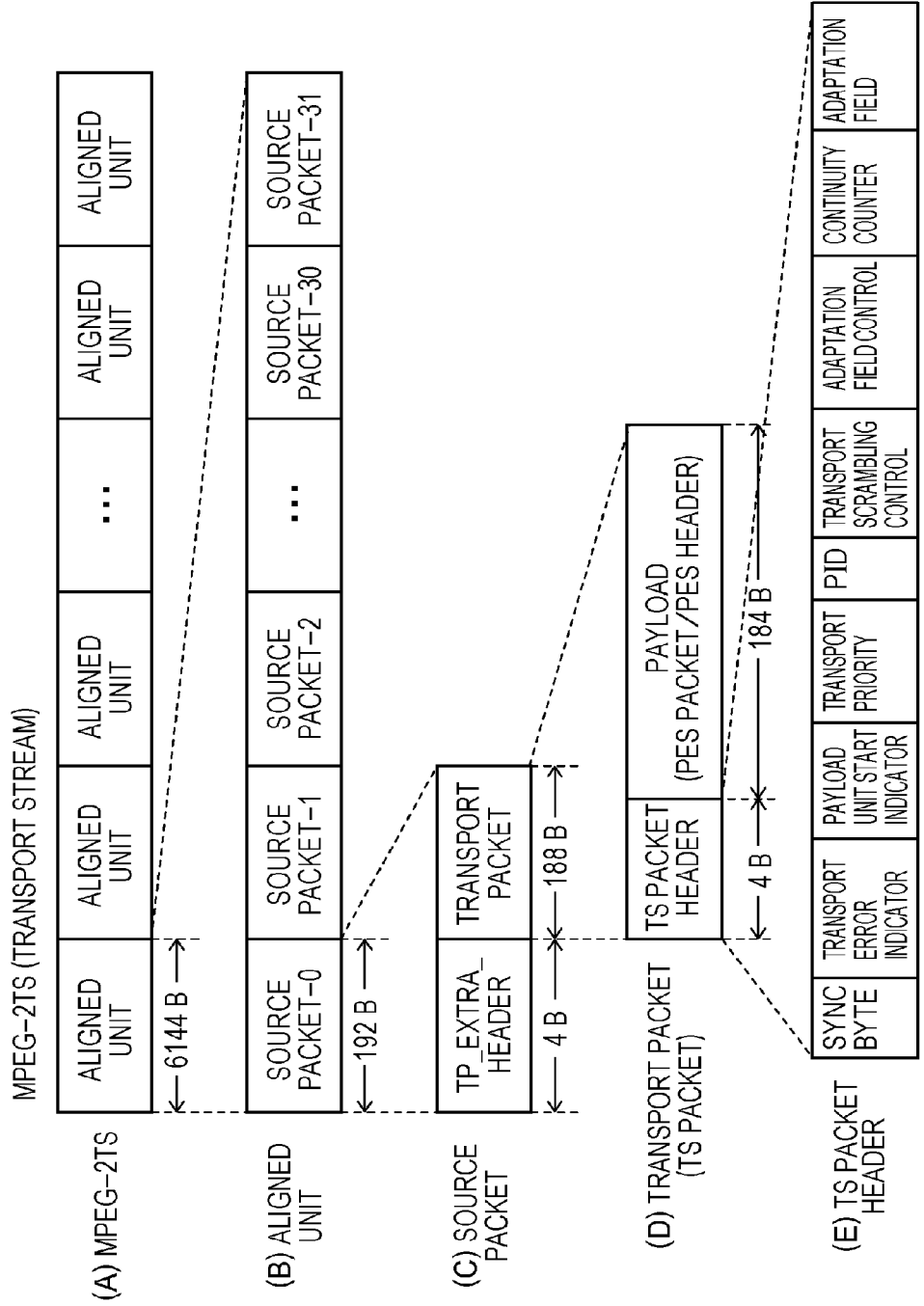
FIG. 8 is a diagram illustrating a configuration example of an MPEG-2TS (transport stream) as a clip AV stream file.

The clip AV stream file in which the actual data of the image and the audio subject to be reproduced is stored has the MPEG-2 transport stream (TS) file structure illustrated FIG. 8.

As illustrated in FIG. 8, the MPEG-2TS format has characteristics as follows.

1) The MPEG-2TS file is formed of the alignment unit.
2) The size of the alignment unit is 6 KB (6144 bytes (2048×3 bytes)).
3) The alignment unit starts from the first byte of the source packet.
4) The length of the source packet is 192 bytes. One source packet is formed of a TP_extra_header and a TS packet. The length of the TP_extra_header is 4 bytes and the length of the TS packet is 188 bytes.
5) The TS packet includes a header (TP header) and a payload portion. In the payload of one TS packet, encoded data of any one of the image and audio data is stored.
6) In the header (TP header) of the TS packet, a PID (a program ID) that indicates the type of the data in the payload is recorded.
7) The payload of the TS packet is formed of a packet (a packetized elementary stream (PES)) in which the elementary stream (ES) that is the encoded image and audio data is stored and a PES header.
8) In the PES header, a presentation time stamp (PTS) that indicates the reproduction time information of the elementary stream (ES) which is stored in the subsequent PES packet and a decoding time stamp (DTS) that indicates the decoding processing time are recorded.

Furthermore, as illustrated in (E) of FIG. 8, each of the following data is stored in the header information of the TS packet.
(a) a sync byte
(b) a transport_error_indicator
(c) a payload_unit_start_indicator
(d) a transport_priority
(e) a program ID (PID)
(f) a transport scrambling control
(g) an adaptation field control
(h) a continuity counter
(i) an adaptation field 4-2. Embodiment of Setting the Variation Data in Units of the Aligned Unit Next, an embodiment of setting the variation data in the units of the aligned unit will be described.

FIGS. 9A and 9B are diagrams illustrating the embodiment of setting the variation data in the units of the aligned unit.

In FIGS. 9A and 9B, following diagrams are illustrated.
(A) a mode of setting the individual segments
(B) a mode of data recording on the disc (A) As illustrated in the mode of setting the individual segments, the individual segment region is a setting having two variation data that are formed of a plurality of aligned unit.

In the present embodiment, each individual segment region has only two variation data.

Each variation data is formed of a plurality of aligned units.

Each aligned unit is data of 6144 bytes.

The identifier corresponding to each variation data is embedded in each variation data set in the individual segment region as the digital watermark.

In the example illustrated in the diagram, the aligned units in which the different digital watermarks are embedded are illustrated as an aligned unit (0b) and an aligned unit (1b).

The individual segment regions are set alternately with common segment regions. The number of settings of the individual segment regions in content corresponding to one title can be various. For example, the number is assumed to be a few hundreds. The reproduction device decrypts the content by applying the plural types of segment keys and one CPS unit key according to the reproduction path set in each reproduction device, and reproduces the decrypted content.

For example, as illustrated in FIG. 9A, in the individual segment regions-1, the reproduction device A selects the aligned unit (0b) as the variation data, and in the individual segment regions-2, selects the aligned unit (1b) as the variation data, and then, reproduces the data.

The reproduction path is determined by the device key possessed by the reproduction device.

FIG. 9B is a diagram illustrating the data record configuration on the disc. As illustrated in FIG. 9B, the data in the individual segment region are recorded in a manner that each of the variation data is alternately recorded in the unit of 6144 byte aligned units.

That is, the aligned unit (0b) and the aligned unit (1b) are alternately recorded.

By recording the data in this way, it is possible to reduce the jump distance executed at the time of data reproduction by the reproduction device. For example, in the individual segment region, in a case where the variation data formed of the aligned unit (0b) is selected and reproduced, the jump distance may be reduced by jumping the aligned unit (1b) of 6144 bytes which is subject to non-reproduction. The 6144 byte data is small data, and a long distance jump is not necessary. Therefore, even in a case the buffered data of the reproduction data is small, it is possible to prevent the pause in reproduction from occurring.

By reading all the data without performing the jump processing, it is also possible to perform the processing of selecting from the read data and reproducing. This processing will be described below.

Next, a specific mode of the data record configuration according to the present embodiment will be described with reference to FIG. 10.

An example of the data record configuration according to the present embodiment is as follows, for example.

(1) Setting in the unit of the content (1a) Total number of individual segment regions set to the content corresponding to one title is 320.

(1b) Total number of segment keys used by the reproduction device is 32.

(2) Setting of the individual segment regions (2a) The length of each individual segment region is a unit of one GOP.

(2b) The lengths of a plurality of variation data set in each of the individual segments region are all the same.

(3) Setting of the common segment regions (3a) The length of the common segment region is approximately ten seconds that is the length of the reproduction time.

One specific example of the data record configuration is as the setting described above.

The setting described above is just one example, and other various settings can be made.

5. A Specific Example of a Data Configuration of the Individual Segment Region

Next, a specific example of the data configuration of the individual segment region will be described with reference to FIGS. 11A and 11B.

5-1. A Configuration Example 1 of the Recorded Data

Figure 11A:
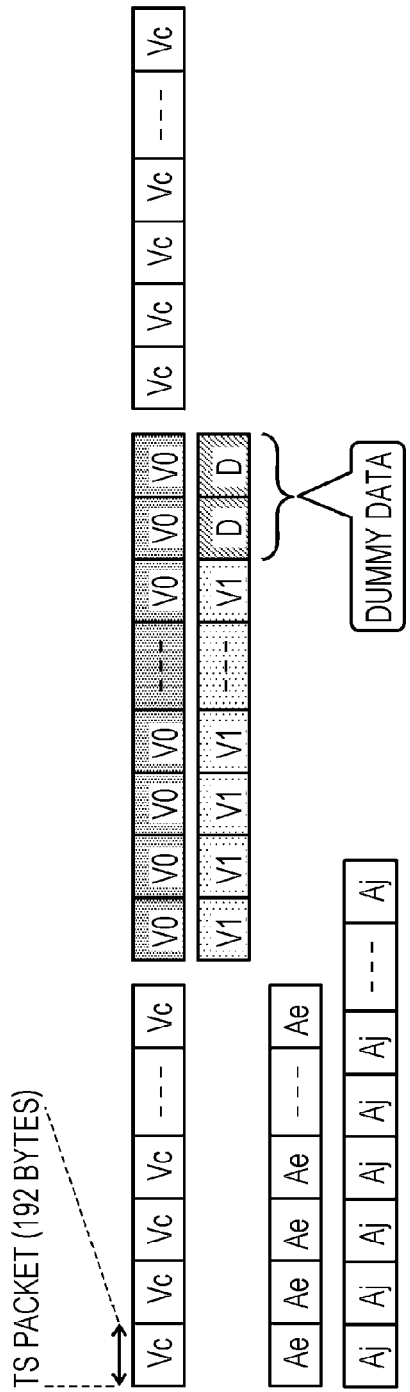
FIGS. 11A and 11B are diagrams illustrating a specific configuration example of the content having individual segment regions and common segment regions.
Figure 11B:
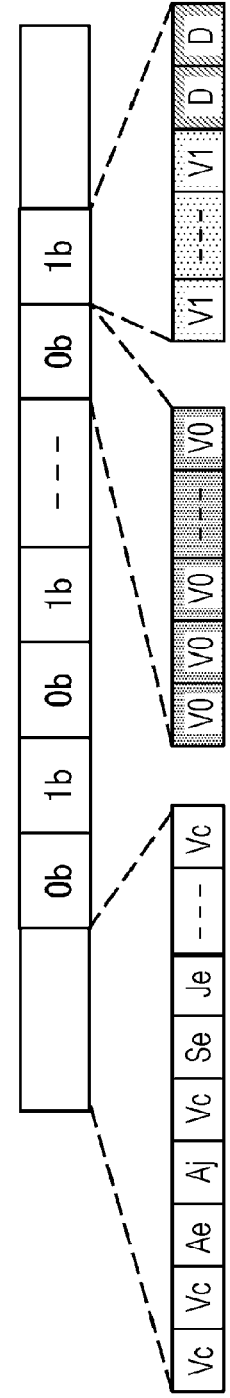

FIGS. 11A and 11B show the following diagrams.

(A) Types of the recorded data configuration packet (B) Record configuration example of each packet As illustrated in FIG. 11A, as an example of the data recorded on the disc, there are data as follows.

(1) Vc: common video data recorded in the common segment region (2) V0: data corresponding to the variation data 0 (0b) recorded in the individual segment region (3) V1: data corresponding to the variation data 1 (1b) recorded in the individual segment region (4) D: dummy data (5) Ae: English audio data (6) Aj: Japanese audio data (7) Se: English subtitle data (8) Sj: Japanese subtitle data The dummy data (D) is data to match the lengths of each variation data recorded in the individual segment region as illustrated in FIG. 11A.

The example illustrated in FIGS. 11A and 11B is an example in which only the video data is recorded in the individual segment region as illustrated in the record configuration example of each packet in FIG. 11B. That is, the audio and subtitle data are not recorded in the individual segment region, but recorded only in the common segment region.

However, there is a case where the dummy data (D) is recorded in the individual segment region to match the data lengths of each variation data.

As previously described with reference to FIG. 9B, the disc record configuration in the individual segment region has a configuration in which the 6144 byte aligned units (0b and 1b) configuring each variation data are alternately recorded, and it may be necessary to use the dummy data (D) to perform this regular alternative recording.

In a case where the digital watermarks embedded in each of the variation data are different from each other, there may be a case where the data lengths of each variation data are different after the digital watermarks are embedded, and the dummy data is used for adjusting this difference.

As described above, there is a case where at least any of the variation data among the plurality of variation data set in the individual segment region has a configuration in which a padding processing is performed by the dummy data in order to match the data sizes of the other variation data.

A data processing unit of the reproduction device performs the processing of selecting the aligned unit corresponding to one variation data which corresponds to the calculated reproduction path from the plurality of aligned units that includes the aligned unit stored in which the dummy data is stored.

Figure 12A:
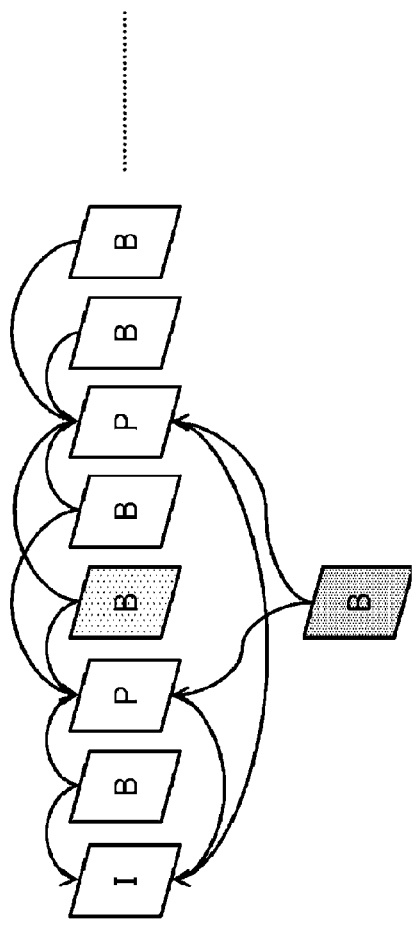
FIGS. 12A and 12B are diagrams illustrating an example of configuration data of the individual segment regions.
Figure 12B:
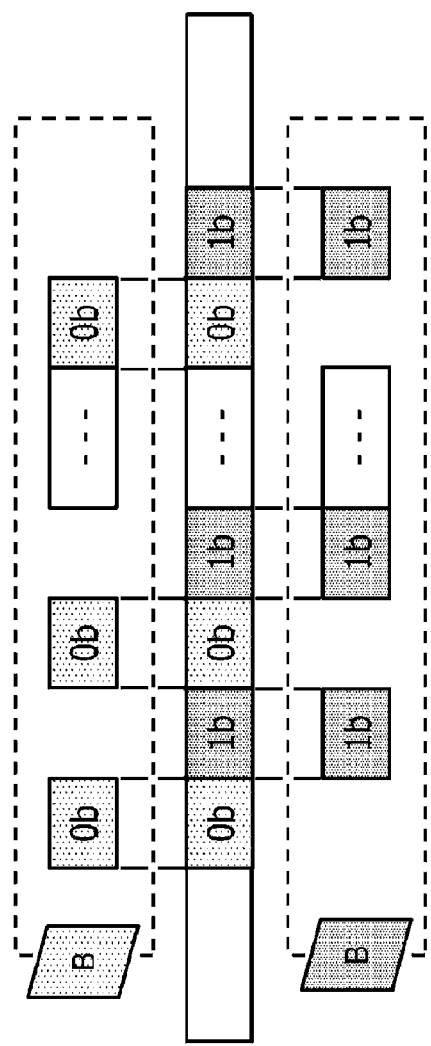

FIGS. 12A and 12B are diagrams illustrating the configuration example of the video data recorded in the individual segment region. The video data is MPEG coded data as illustrated in FIG. 12A and is formed of I, P, and B pictures.

The I picture is a picture that can be decrypted alone, and is to be a reference at the time of the decryption of each of the P and B pictures.

The P picture is a picture that can be decrypted by referring to the preceding I picture, and the B picture is a picture that can be decrypted by referring to the preceding I and subsequent P pictures.

As illustrated in FIG. 12B, the B picture is the only data stored in the individual segment region. The B picture has no possibility of being referred to at the time of decryption of other pictures, and doesn't affects the decryption processing of the other pictures although the change in image data occurs by the embedding of the digital watermark (WM).

For this reason, only the B picture is selected and used as the digital watermark (WM) embedded image data.

The example illustrated in FIG. 12B is an example in which the data configuring one B picture is divided into the configuration packets of the plurality of aligned units set in the individual segment region, and stored.

In a case of recording the data having such a setting into the information recording medium, the data processing unit of the reproduction device executing the content reproduction executes the reproduction processing of the video data read from the individual segment region and the common segment region and the audio data read from the common segment region. AS the reproduction processing of the video data, the data processing unit reads the B picture from the individual segment region and I, P, and B pictures from the common segment region, and then, executes the decryption and reproduction processing.

5-2. A Configuration Example 2 of the Recorded Data

Next, a configuration example 2 of the recorded data will be described with reference to FIGS. 13A and 13B. FIGS. 13A and 13B show the following diagrams as similar to FIGS. 11A and 11B.

(A) Types of the recorded data configuration packet (B) Record configuration example of each packet FIG. 13A illustrates an example of the data recorded on the disc as similar to FIG. 11A. For example, there are data as follows.

(1) Vc: common video data recorded in the common segment region (2) V0: data corresponding to the variation data 0 (0b) recorded in the individual segment region (3) V1: data corresponding to the variation data 1 (1b) recorded in the individual segment region (4) D: dummy data (5) Ae: English audio data (6) Aj: Japanese audio data (7) Se: English subtitle data (8) Sj: Japanese subtitle data The dummy data (D) is data to match the lengths of each variation data recorded in the individual segment region as illustrated in FIG. 13A.

The example illustrated in FIGS. 13A and 13B is an example in which not only the video data but also the audio data and the subtitle data is recorded in the individual segment region as illustrated in the record configuration example of each packet in FIG. 13B. The digital watermark is not embedded in the audio data and the subtitle data.

The audio data and the subtitle data recorded in each of the plurality of variation data recorded in the individual segment region are all the same data.

There is a case where the dummy data (D) is recorded in the individual segment region to match the data lengths of each variation data.

Figure 14A:
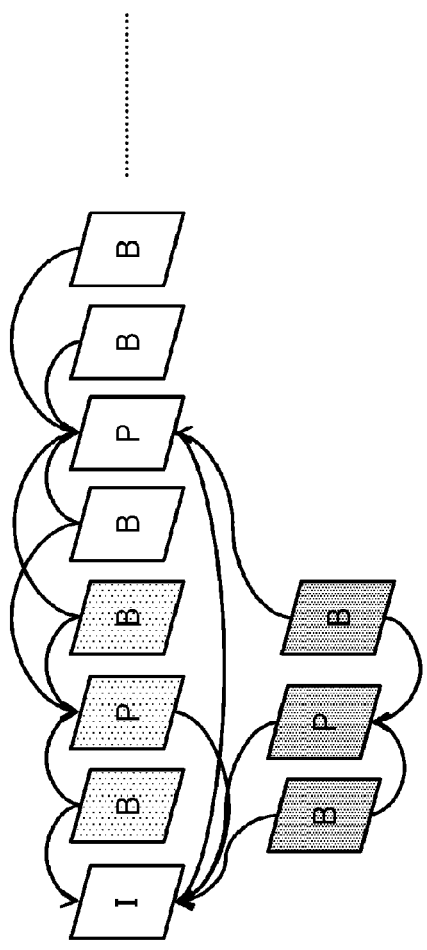
FIGS. 14A and 14B are diagrams illustrating an example of configuration data of the individual segment regions.
Figure 14B:
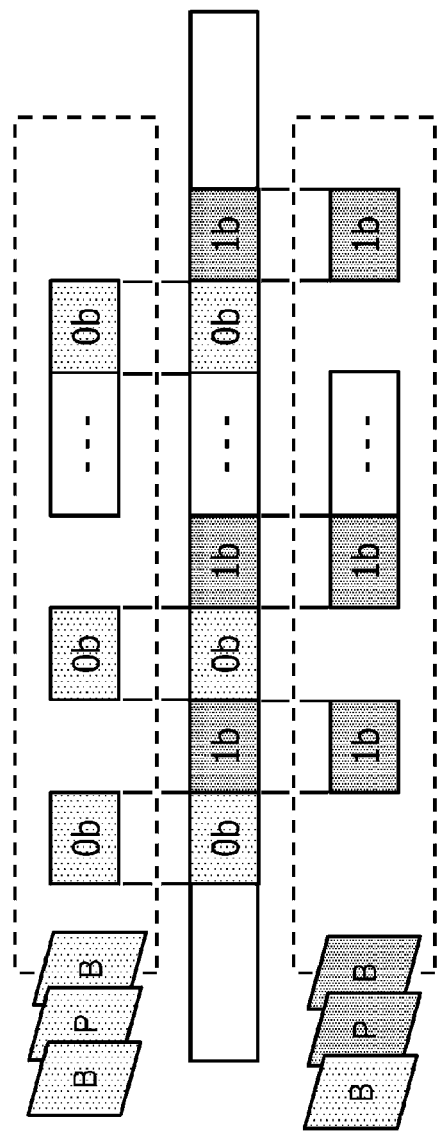

FIGS. 14A and 14B are diagrams illustrating a configuration example of the video data recorded in the individual segment region. The video data is MPEG coded data as illustrated in FIG. 14A and is formed of I, P, and B pictures.

In the present embodiment, the P picture and the B picture are recorded in the individual segment region. That is, the P picture and the B picture are selected and used as the digital watermark (WM) embedded image data.

However, it is preferable that the P picture and the B picture recorded in the individual segment region is formed of a group of pictures that are not to be a reference at the time of the decryption of the picture recorded in the region other than the individual segment region.

The example illustrated in FIG. 14B is an example in which the data configuring two B pictures and one P picture are divided into the configuration packets of the plurality of aligned units set in the individual segment region, and stored.

In a case of recording the data having such a setting into the information recording medium, the data processing unit of the reproduction device executing the content reproduction reads the B picture and P picture from the individual segment region and I, P, and B pictures from the common segment region, and then, executes the decryption and the reproduction processing.

6. Data Size of the Common Segment Region

As is apparent from the configurations described with reference to FIG. 11A to FIG. 14B, the I picture is not recorded in the individual segment region.

The I picture is recorded only in the common segment region.

The I picture is image data that can be decrypted alone, and for example, is an image set in the reproduction start position (an entry point=a random access point) in a case where the random access processing is executed.

Figure 15:
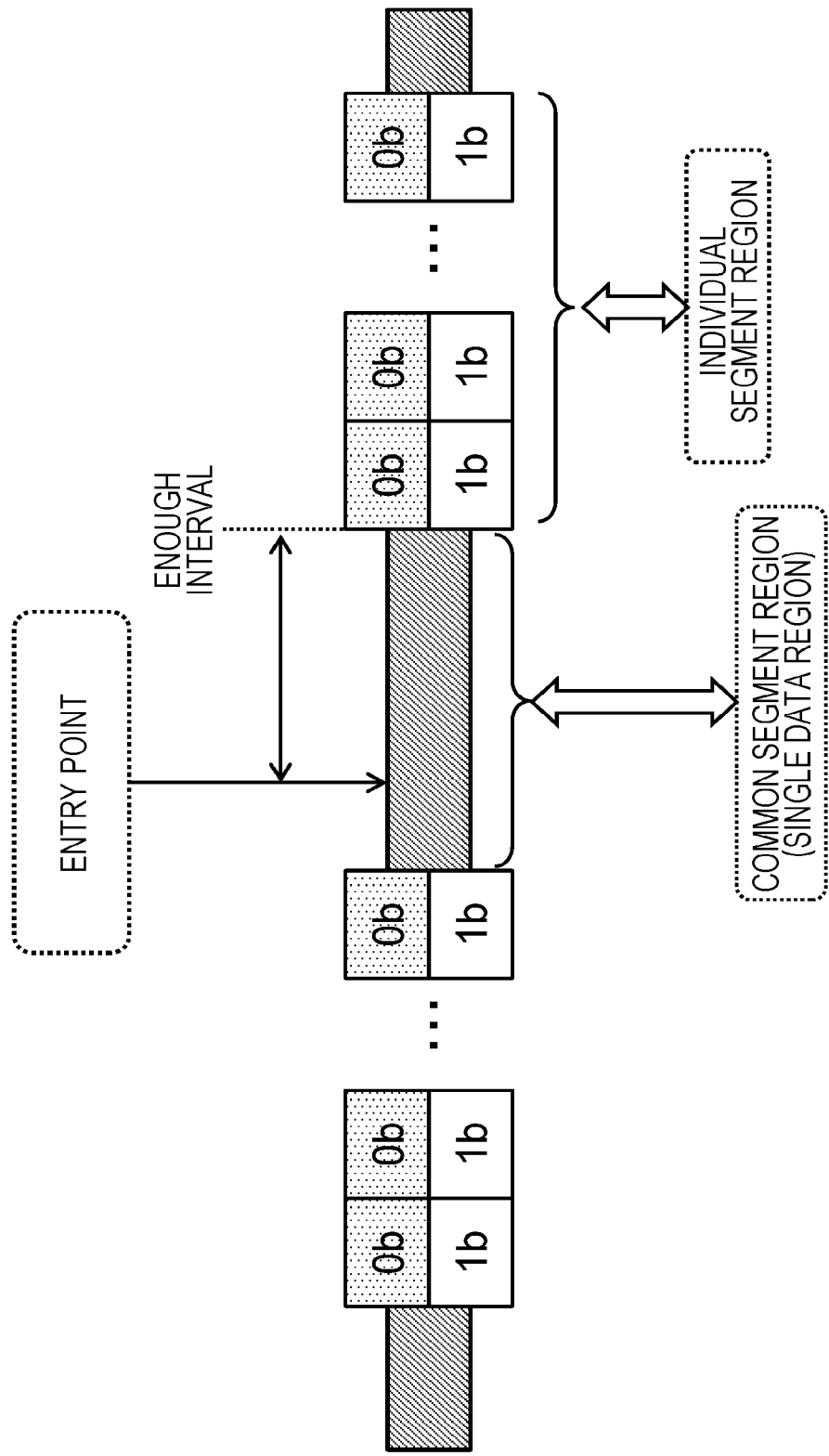
FIG. 15 is a diagram illustrating a configuration example of the common segment regions.

In FIG. 15, an example of setting the entry point.

This entry point (random access point) information is recorded, for example, in the clip information file as the EP map. The reproduction device detects the entry point (position where the I pictures is recorded) which is closest to the position designated by the user from the EP (entry point) map recorded in the clip information file according to the random access reproduction designation by the user, and starts the random access reproduction processing.

When the processing of detecting the entry point from the EP map is ended, the decryption processing of the picture data after the I picture of the entry point is executed and the reproduction processing is started.

If the data is in the common segment region, the decryption can sequentially be performed by applying one CPS unit key. However, in the individual segment region, it is necessary to decrypt by acquiring the segment key selected according to the reproduction path.

Therefore, if the individual segment region exists right after the entry point, there is a possibility that the acquisition of the segment key according to the reproduction path may be too late.

In order to prevent this problem, it is desirable to set the distance (reproduction time) from the entry point (the random accessible I picture position) set in the common segment region to the start position of the next individual segment region is equal to or longer than the time necessary for acquiring the segment key of the reproduction device.

It is preferable that the EP map is created in accordance with this condition and is recorded in the clip information file.

7. Configuration Example of a Segment Key File

Next, a configuration example of a segment key file will be described with reference to FIG. 16.

Each reproduction device can acquire the segment key from the segment key file stored on the disc together with the content using the key (device key) stored in each device.

However, the segment key that can be acquired using the device key stored in one reproduction device can decrypt only one variation data included in the plurality of variation data set in one individual segment region.

The reproduction device selects one variation data that can be decrypted from one individual segment region using the segment key obtained from the segment key file, and performs the decryption and reproduction processing. The decryption processing is executed in the unit of aligned unit. One segment key can commonly be used in the decryption of the plurality of aligned unit that configures one variation data in one individual segment region.

A combination of the segment keys acquirable from the segment key file differs according to the device key stored in the reproduction device.

The reproduction device selects one variation data that can be decrypted from one individual segment region using the segment key obtained from the segment key file, and executes the decryption and reproduction processing.

Figure 16:
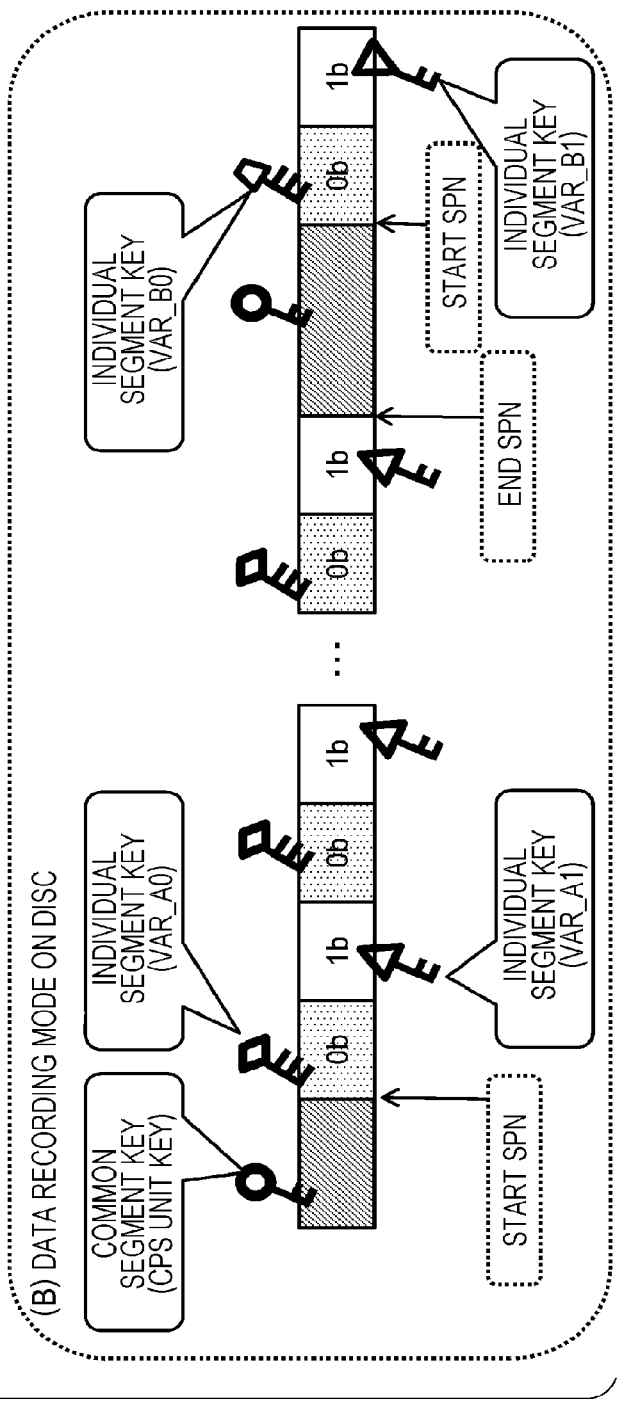
FIG. 16 is a diagram illustrating a configuration example of a segment key file.

In FIG. 16, the configuration example of the segment key file is illustrated.

As illustrated in FIG. 16, the following data are stored in the segment key file.

(1) Individual segment region start source package number (start SPN)

(2) Individual segment region end source package number (end SPN)

(3-1 to 2) Encrypted Segment Keys (VAR_0 and 1) Corresponding to the Variations (1) The individual segment region start source package number (start SPN) is a source packet identifier that identifies the source packet at the start position of the individual segment region.

(2) The individual segment region end source package number (end SPN) is a source packet identifier that identifies the source packet at the end position of the individual segment region.

The data processing unit of the reproduction device determines the application region of the segment key based on the start SPN and the end SPN of each individual segment region.

(3-1 to 2) The Encrypted segment keys (VAR_0 and 1) corresponding to the variations is the encrypted segment key in which the segment key applied to the decryption of the variation data set in each individual segment region is encrypted.

This example of the segment key file corresponds to a n example in which two variation data are set in one individual segment region.

As described above the encrypted segment key can be decrypted by the data processing using the device key stored in the reproduction device.

However, one reproduction device can acquire only one segment key as the decryption key for one individual segment region.

8. Example of Data Reproduction Processing Executed by the Reproduction Device

Next, an example of the data reproduction processing executed by the reproduction device will be described.

The reproduction device reproduces the data in the common segment region and one variation data selected from the plurality of variation data in the individual segment region according to the reproduction path.

The example of the data reproduction processing will be described with reference to FIG. 17.

Figure 17:
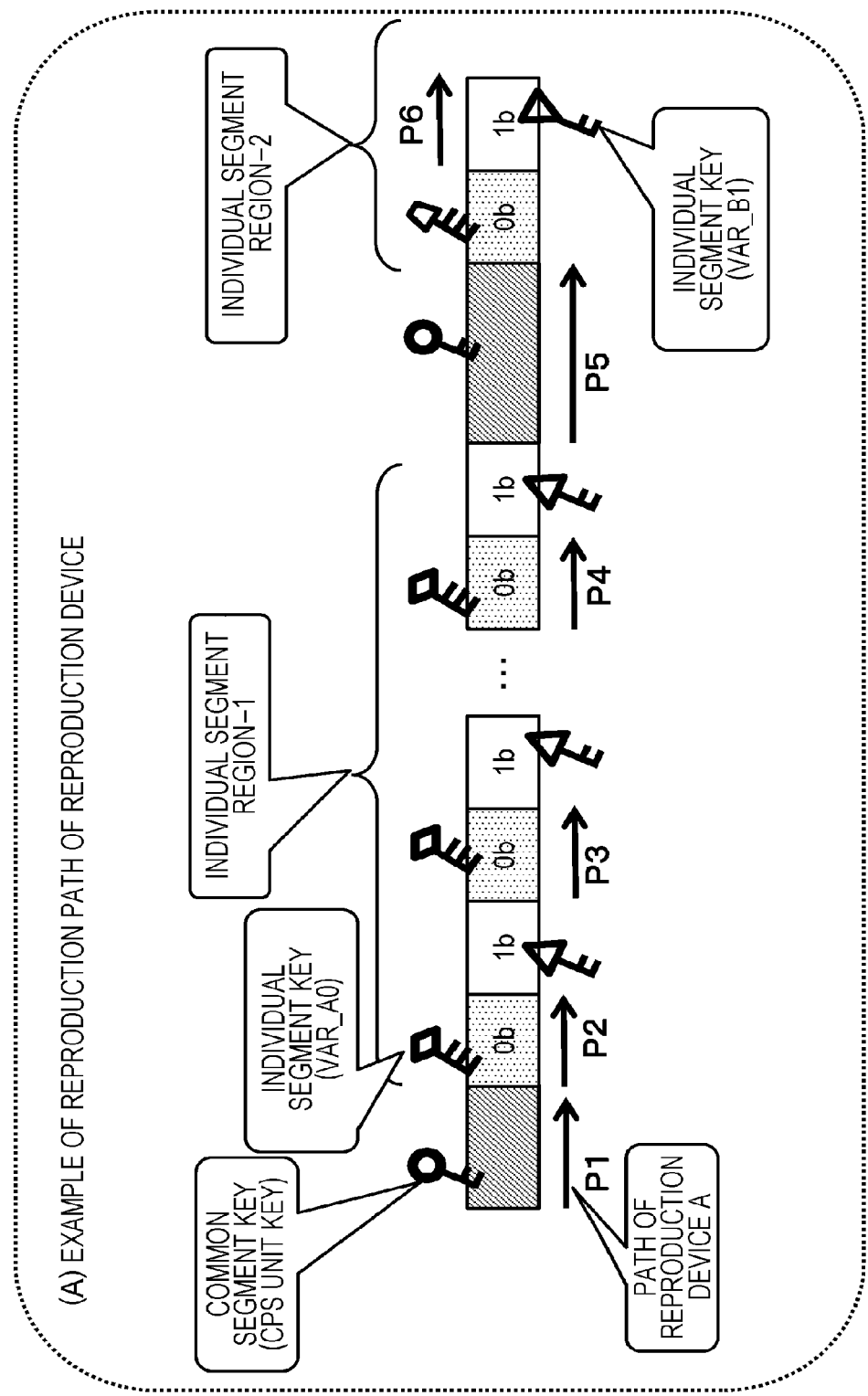
FIG. 17 is a diagram illustrating an example of reproduction processing of a reproduction device.

In FIG. 17, the reproduction paths (P1 to P6) of the reproduction device A is illustrated.

A path P1 is the common segment region, and the decryption processing in which the CPS unit key is applied is executed.

Paths P2 to P4 are the reproduction processing tasks of the plurality of aligned unit (0b) that configures one variation data in the individual segment region-1, and the decryption processing in which the segment key (VAR_A0) is applied is executed, and the data is reproduced.

A path P5 is the common segment region, and the decryption processing in which the CPS unit key is applied is executed.

A path P6 and subsequent thereto are the reproduction processing tasks of the plurality of aligned unit (1b) that configures one variation data in the individual segment region-2, and the decryption processing in which the segment key (VAR_B1) is applied is executed, and the data is reproduced.

As described above, it is necessary for the reproduction device to selectively acquire every other different variation data that are alternately recorded in the unit of the aligned unit from the each individual segment region, and to perform the decryption processing, and then, to execute the reproduction.

Three examples of specific reproduction processing will be described as follows.

(Example 1 of Data Reproduction Processing) Example of Data Reproduction Processing in which Filtering Processing is Executed by a Filter Processing Unit and Only the Data According to a Reproduction Path is Selectively Acquired and Reproduced (Example 2 of Data Reproduction Processing) Example of Data Reproduction Processing in which Only the Data that can be Decrypted is Decrypted in the Decryption Unit and the Data According to the Reproduction Path is Generated and Reproduced (Example 3 of Data Reproduction Processing) in a Separation Unit (a Demultiplexer), Only the Data According to the Reproduction Path is Selectively Acquired and Reproduced 8-1. (Example 1 of Data Reproduction Processing) Example of Data Reproduction Processing in which Filtering Processing is Executed by the Filter Processing Unit and Only the Data According to the Reproduction Path is Selectively Acquired and Reproduced First, as the example 1 of data reproduction processing, example of data reproduction processing in which filtering processing is executed by the filter processing unit and only the data according to the reproduction path is selectively acquired and reproduced will be described with reference to FIG. 18.

Figure 18:
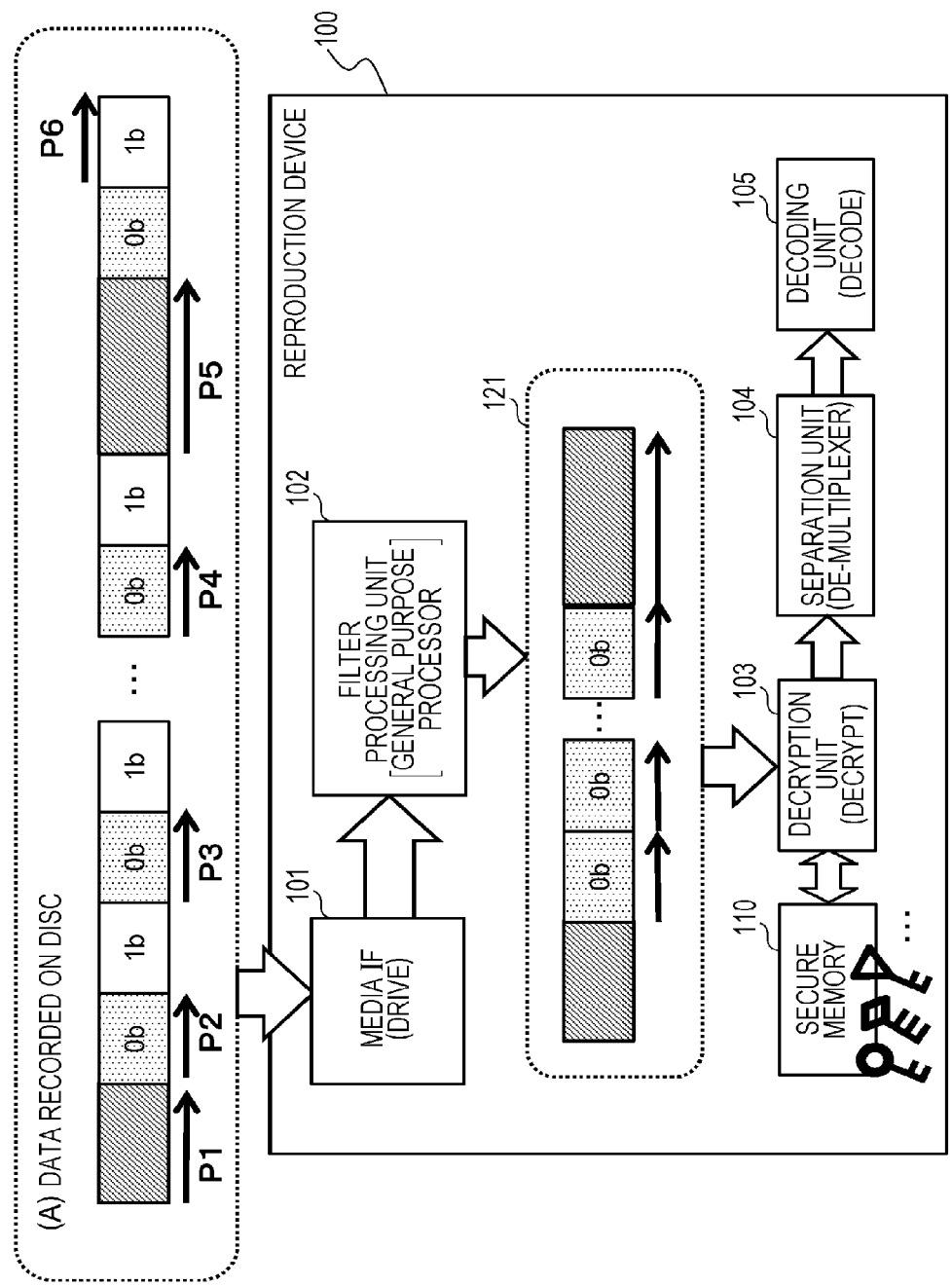
FIG. 18 is a diagram illustrating an example of reproduction processing of a reproduction device.

(A) of FIG. 18 illustrates the data recorded on the disc. Furthermore, the reproduction paths of a reproduction device 100 are illustrated by arrows (P1 to P6). The reproduction paths are similar to those described with reference to FIG. 17.

The path P1 is the common segment region, and the decryption processing in which the CPS unit key is applied is executed.

The paths P2 to P4 are the reproduction processing tasks of the plurality of aligned unit (0b) that configures one variation data in the individual segment region-1, and the decryption processing in which the segment key (VAR_A0) is applied is executed, and the data is reproduced.

The path P5 is the common segment region, and the decryption processing in which the CPS unit key is applied is executed.

A path P6 and subsequent thereto are the reproduction processing tasks of the plurality of aligned unit (1b) that configures one variation data in the individual segment region-2, and the decryption processing in which the segment key (VAR_B1) is applied is executed, and the data is reproduced.

The reproduction device 100 decrypts the data in the segment region selected from the data recorded on the disc illustrated in (A) of FIG. 18 according to the reproduction path, and then, reproduces the decrypted data.

A media IF (drive) 101 of the reproduction device 100 illustrated in FIG. 18 reads the data recorded on the disc illustrated in (A) of FIG. 18, and outputs the data to a filter processing unit 102.

In this example, the media IF (drive) 101 sequentially reads all the data without performing the jump processing at the time of data reading and outputs the data to the filter processing unit 102.

The filter processing unit 102 is formed of, for example, a general purpose processor.

The filter processing unit 102 acquires the reproduction path information in advance, selects only the data subject to the reproduction of the reproduction device 100 according to the reproduction path information, and then, outputs the selected data to a decryption unit (decrypt) 103.

As previously described with reference to FIG. 4, the reproduction path information can be obtained by the processing of applying the device key held in the reproduction device.

The filter processing unit 102 sequentially selects the aligned unit that configures one variation data selected from the data in the common segment region and the data in the individual segment region according to the reproduction path information, generates reproduction path corresponding data 121, and then, outputs the generated data to the decryption unit 103.

The decryption unit (decrypt) 103 executes the decryption processing in which the key corresponding to each segment region is applied by inputting the reproduction path corresponding data 121.

With regard to the common segment region, the decryption processing is executed by applying the CPS unit key obtained from the CPS unit key file.

With regard to the aligned unit that configures the variation data selected from the individual segment region, the decryption processing is executed by applying the segment key obtained from the segment key file.

The CPS unit key file and the segment key file are recorded on the disc together with the content. The keys acquired from each file are stored in a secure memory 110 and are successively used in a switching manner.

With regard to one individual segment region, the segment key acquirable from the segment key file by the reproduction device 100 is the only key that is applied to the decryption of one variation data selected from the plurality of variation data in one segment region according to the reproduction path.

In this case, the acquirable key is the segment key that is applied to the decryption of the aligned unit in the individual segment region included in the reproduction path corresponding data 121.

The decryption unit (decrypt) 103 executes the decryption processing in which the key corresponding to each segment region is applied by inputting the reproduction path corresponding data 121, and then, outputs the decrypted data to the separation unit (demultiplexer) 104.

The separation unit (demultiplexer) 104 separates the decrypted data input from the decryption unit (decrypt) 103 according to the types (the image, the audio, or the subtitle) of the data, and outputs the separated data to a decoding unit (decode) 105.

The data separation is executed with reference to the PID recorded in the TS packet header in which each data is stored.

The decoding unit 105 executes the decoding processing for each of the coded data of the image, the audio, and the subtitle, corresponding to each encoding mode.

The result of the decoding which is generated by the decoding processing by the decoding unit 105 is output as the reproduction data.

8-2. (Example 2 of Data Reproduction Processing) Example of Data Reproduction Processing in which Only the Data that can be Decrypted is Decrypted in the Decryption Unit and the Data According to the Reproduction Path is Generated and Reproduced Next, as the example 2 of data reproduction processing, an example of the reproduction processing in which only the data that can be decrypted is decrypted and the data according to the reproduction path is generated and reproduced in the decryption unit, will be described with reference to FIG. 19.

Figure 19:
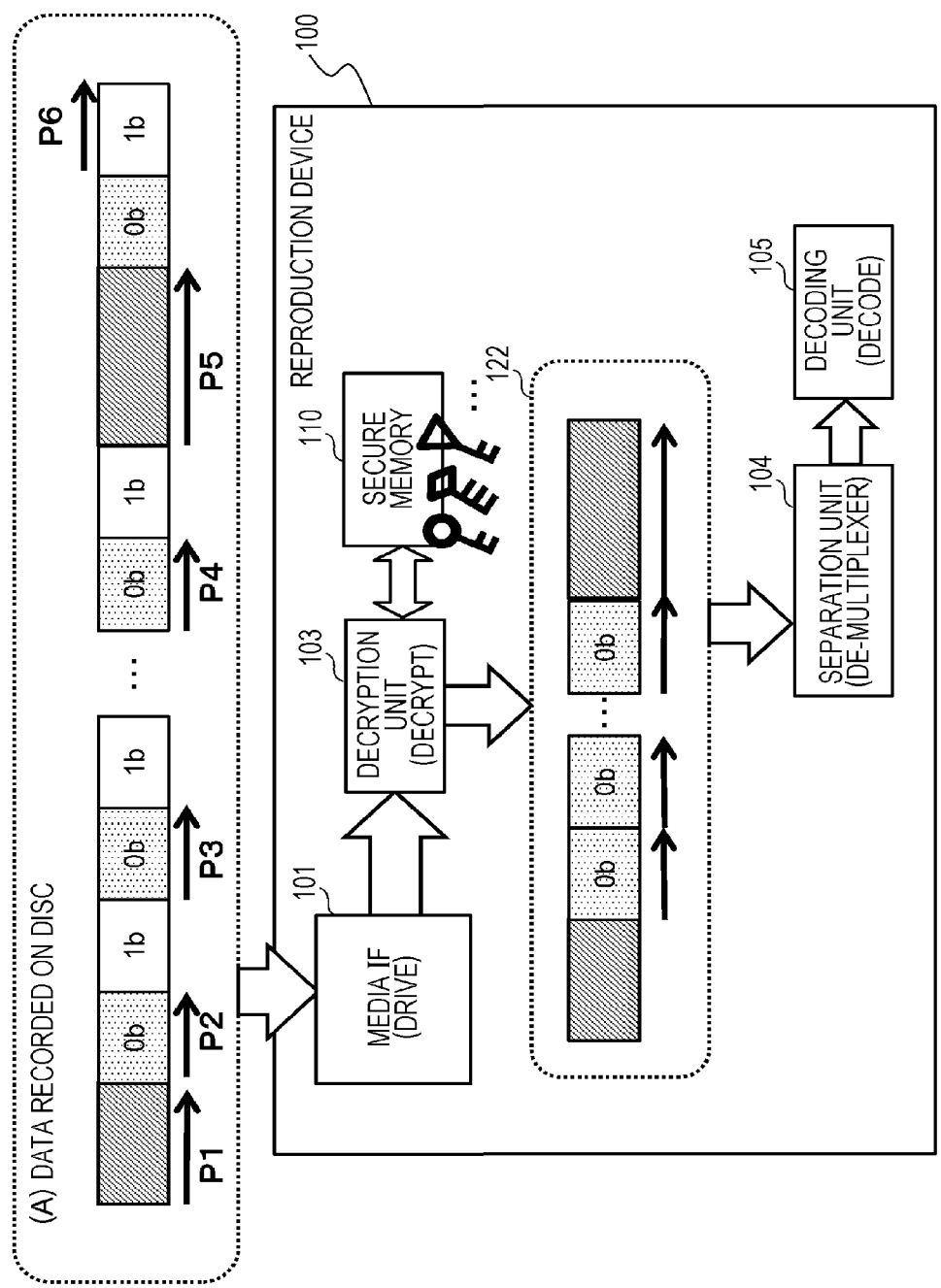
FIG. 19 is a diagram illustrating an example of reproduction processing of a reproduction device.

(A) of FIG. 19 illustrates the data recorded on the disc. Furthermore, the reproduction paths of the reproduction device 100 are illustrated by arrows (P1 to P6). These reproduction paths are similar to the reproduction paths described with reference to FIG. 17.

The path P1 is the common segment region, and the decryption processing in which the CPS unit key is applied is executed.

Paths P2 to P4 are the reproduction processing tasks of the plurality of aligned unit (0b) that configures one variation data in the individual segment region-1, and the decryption processing in which the segment key (VAR_A0) is applied is executed, and the data is reproduced.

A path P5 is the common segment region, and the decryption processing in which the CPS unit key is applied is executed.

A path P6 and subsequent thereto are the reproduction processing tasks of the plurality of aligned unit (1b) that configures one variation data in the individual segment region-2, and the decryption processing in which the segment key (VAR_B1) is applied is executed, and the data is reproduced.

The reproduction device 100 decrypts the data in the segment region selected from the data recorded on the disc illustrated in (A) of FIG. 19 according to the reproduction path, and then, reproduces the decrypted data.

A media IF (drive) 101 of the reproduction device 100 illustrated in FIG. 19 reads the data recorded on the disc illustrated in(A) of FIG. 19 and outputs the data to a filter processing unit 102.

In this example, the media IF (drive) 101 sequentially reads all the data without performing the jump processing at the time of data reading and outputs the data to the decryption unit (decrypt) 103.

The decryption unit (decrypt) 103 acquires the reproduction path information in advance, selects only the data of the reproduction device 100 subject to be reproduced according to the reproduction path information, performs the decryption processing of the data that can be decrypted, generates the decrypted data 122 corresponding to the reproduction path, and then, outputs the decrypted data to the separation unit (demultiplexer) 104.

As previously described with reference to FIG. 4, the reproduction path information can be obtained by the processing of applying the device key held in the reproduction device.

The decryption unit (decrypt) 103 sequentially selects the aligned unit that configures one variation data selected from the common segment region data and the individual segment region data according to the reproduction path information, and executes the decryption processing in which the key corresponding to each segment region is applied.

With regard to the common segment region, the decryption processing is executed by applying the CPS unit key obtained from the CPS unit key file.

With regard to the aligned unit that configures the variation data selected from the individual segment region, the decryption processing is executed by applying the segment key obtained from the segment key file.

The CPS unit key file and the segment key file are recorded on the disc together with the content. The keys acquired from each file are stored in a secure memory 110 and are successively used in a switching manner.

With regard to one individual segment region, the segment key acquirable from the segment key file by the reproduction device 100 is the only key that is applied to the decryption of one variation data selected from the plurality of variation data in one segment region according to the reproduction path.

The decryption unit (decrypt) 103 executes the decryption processing in which the key corresponding to each segment region is applied, generates the reproduction path corresponding decrypted data 122, and then, outputs the decrypted data to the separation unit (demultiplexer) 104.

The separation unit (demultiplexer) 104 separates the reproduction path corresponding decrypted data 122 input from the decryption unit (decrypt) 103 according to the types (the image, the audio, or the subtitle) of the data, and outputs the separated data to a decoding unit (decode) 105.

The data separation is executed with reference to the PID recorded in the TS packet header in which each data is stored.

The decoding unit 105 executes the decoding processing for each of the coded data of the image, the audio, and the subtitle, corresponding to each encoding mode.

The result of the decoding which is generated by the decoding processing by the decoding unit 105 is output as the reproduction data.

8-3. (Example 3 of Data Reproduction Processing) In a Separation Unit (a Demultiplexer), Only the Data According to the Reproduction Path is Selectively Acquired from the Decryption Result and Reproduced Next, as the example 3 of data reproduction processing, an example of the reproduction processing in which only the data according to the reproduction path is selectively acquired from the decryption result and reproduced in the separation unit (multiplexer), will be described with reference to FIG. 20.

Figure 20:
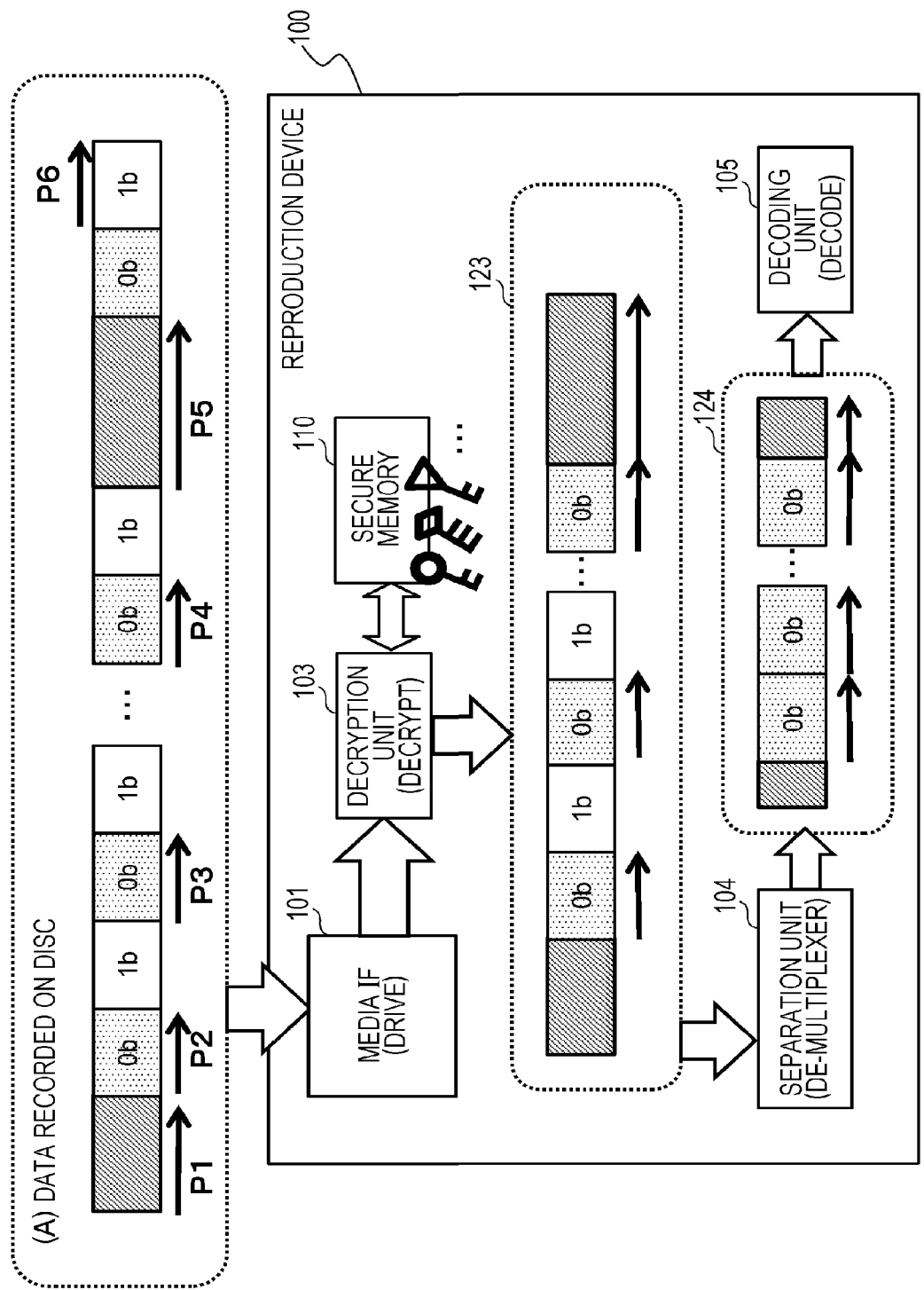
FIG. 20 is a diagram illustrating an example of reproduction processing of a reproduction device.

(A) of FIG. 20 illustrates the data recorded on the disc. Furthermore, the reproduction paths of the reproduction device 100 are illustrated by arrows (P1 to P6). These reproduction paths are similar to the reproduction paths described with reference to FIG. 17.

The path P1 is the common segment region, and the decryption processing in which the CPS unit key is applied is executed.

Paths P2 to P4 are the reproduction processing tasks of the plurality of aligned unit (0b) that configures one variation data in the individual segment region-1, and the decryption processing in which the segment key (VAR_A0) is applied is executed, and the data is reproduced.

A path P5 is the common segment region, and the decryption processing in which the CPS unit key is applied is executed.

A path P6 and subsequent thereto are the reproduction processing tasks of the plurality of aligned unit (1b) that configures one variation data in the individual segment region-2, and the decryption processing in which the segment key (VAR_B1) is applied is executed, and the data is reproduced.

The reproduction device 100 decrypts the data in the segment region selected from the data recorded on the disc illustrated in (A) of FIG. 20 according to the reproduction path, and then, reproduces the decrypted data.

A media IF (drive) 101 of the reproduction device 100 illustrated in FIG. 20 reads the data recorded on the disc illustrated in (A) of FIG. 20 and outputs the data to a filter processing unit 102.

In this example, the media IF (drive) 101 sequentially reads all the data without performing the jump processing at the time of data reading and outputs the data to the decryption unit (decrypt) 103.

The decryption unit (decrypt) 103 performs the decryption processing of only the data that can be decrypted. The undecryptable data is output as the encrypted data as it is. That is, the decryption unit (decrypt) 103 generates mixed data 123 illustrated in FIG. 20 in which the reproduction path corresponding decrypted data and the reproduction path non-corresponding encrypted data are mixed, and outputs the mixed data to the separation unit (demultiplexer) 104.

The decryption unit (decrypt) 103 sequentially selects the aligned unit that configures one variation data selected from the data in the common segment region and the data in the individual segment region, and executes the decryption processing in which the key corresponding to each segment region is applied.

With regard to the common segment region, the decryption processing is executed by applying the CPS unit key obtained from the CPS unit key file.

With regard to the common segment region, the decryption processing is executed by applying the CPS unit key obtained from the CPS unit key file.

The CPS unit key file and the segment key file are recorded on the disc together with the content. The keys acquired from each file are stored in a secure memory 110 and are successively used in a switching manner.

With regard to one individual segment region, the segment key acquirable from the segment key file by the reproduction device 100 is the only key that is applied to the decryption of one variation data selected from the plurality of variation data in one segment region according to the reproduction path.

The decryption unit (decrypt) 103 executes the decryption processing in which the keys corresponding to each segment region, generates the mixed data 123 in which the reproduction path corresponding decrypted data and the reproduction path non-corresponding encrypted data are mixed, and outputs the mixed data to the unit (demultiplexer) 104.

The separation unit (demultiplexer) 104 selects only the reproduction path corresponding decrypted data from the mixed data 123 in which the reproduction path corresponding decrypted data and the reproduction path non-corresponding encrypted data input from the decryption unit (decrypt) 103 are mixed, and separates the selected data according to the types (the image, the audio, or the subtitle) of the data, and outputs the separated data to the decoding unit (decode) 105.

The separation unit (demultiplexer) 104 acquires the reproduction path information in advance, and selects only the data subject to the reproduction of the reproduction device 100 according to the reproduction path information.

In the selection processing of the data subject to the reproduction, the PID can be used, which is recorded as the TS packet header stored in the image data or the like.

An example of selection and acquisition processing of the packet using the PID will be described with reference to FIG. 21.

Figure 21:
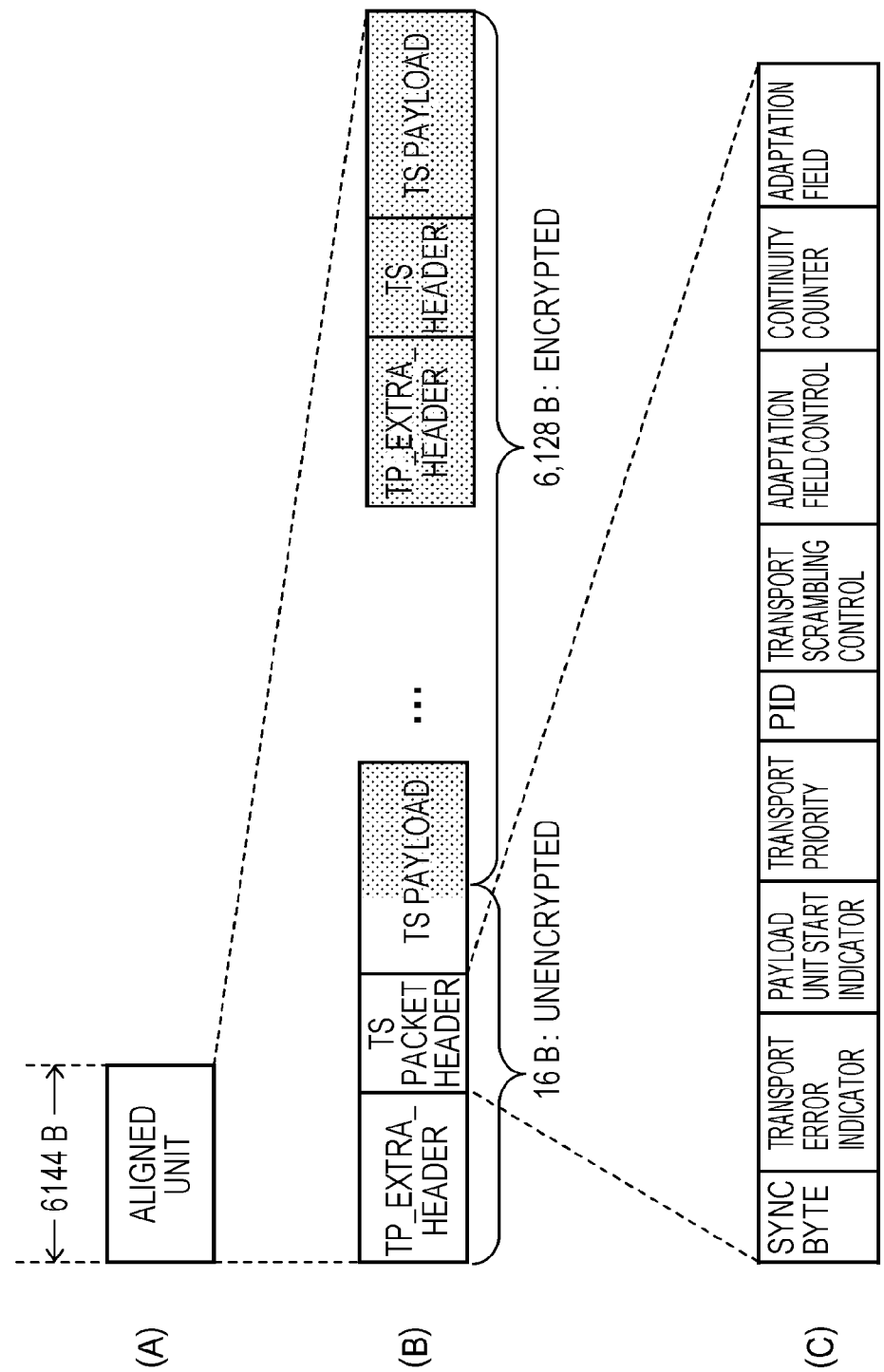
FIG. 21 is a diagram illustrating an example of packet discrimination processing using a PID in the reproduction processing of the reproduction device.

FIG. 21 illustrates the configuration example of the following data:

(A) the aligned unit (6144 bytes),
(B) a detailed configuration of the aligned unit, and
(C) a detailed configuration of the TS packet header.

As illustrated in (C) of FIG. 21, the PID is stored in the TS packet header. However, in a state in which the decryption is not executed, only the 18 bytes at the head of the 6144 byte aligned unit are set as unencrypted data and subsequent 6128 bytes are the encrypted data as it is.

Therefore, the separation unit (demultiplexer) 104 executes the packet selection referring to only the TS packet header of the TS packet at the head of the aligned unit.

The separation unit (demultiplexer) 104 selects the packet stored in the data corresponding to the segment subject to the reproduction according to the reproduction path information based on the PID and outputs the selected packet to the decoding unit 105.

The packet stored in the data corresponding to the segment which is not subject to the reproduction is not output to the decoding unit 105.

The data subject to the reproduction generated by the selection processing described above is the reproduction path corresponding decrypted data 124 illustrated in FIG. 20.

The separation unit (demultiplexer) 104 executes the separation processing of the data according to the types (the image, the audio, or the subtitle) of the data in addition to the selection processing of the reproduction path corresponding data, and outputs the separated data to a decoding unit (decode) 105.

The data separation processing is also executed referring to the PID recorded in the TS packet header in which each data is stored.

The decoding unit 105 executes the decoding processing for each of the coded data of the image, the audio, and the subtitle, corresponding to each encoding mode.

The decoding result generated by the decoding processing of the decoding unit 105 is output as the reproduction data.

9. Example of Recording Processing of a Digital Watermark with Respect to Content and Manufacturing Processing of a Disc Next, an example of the recording processing of a digital watermark with respect to content and manufacturing processing of a disc will be described.

Figure 22:
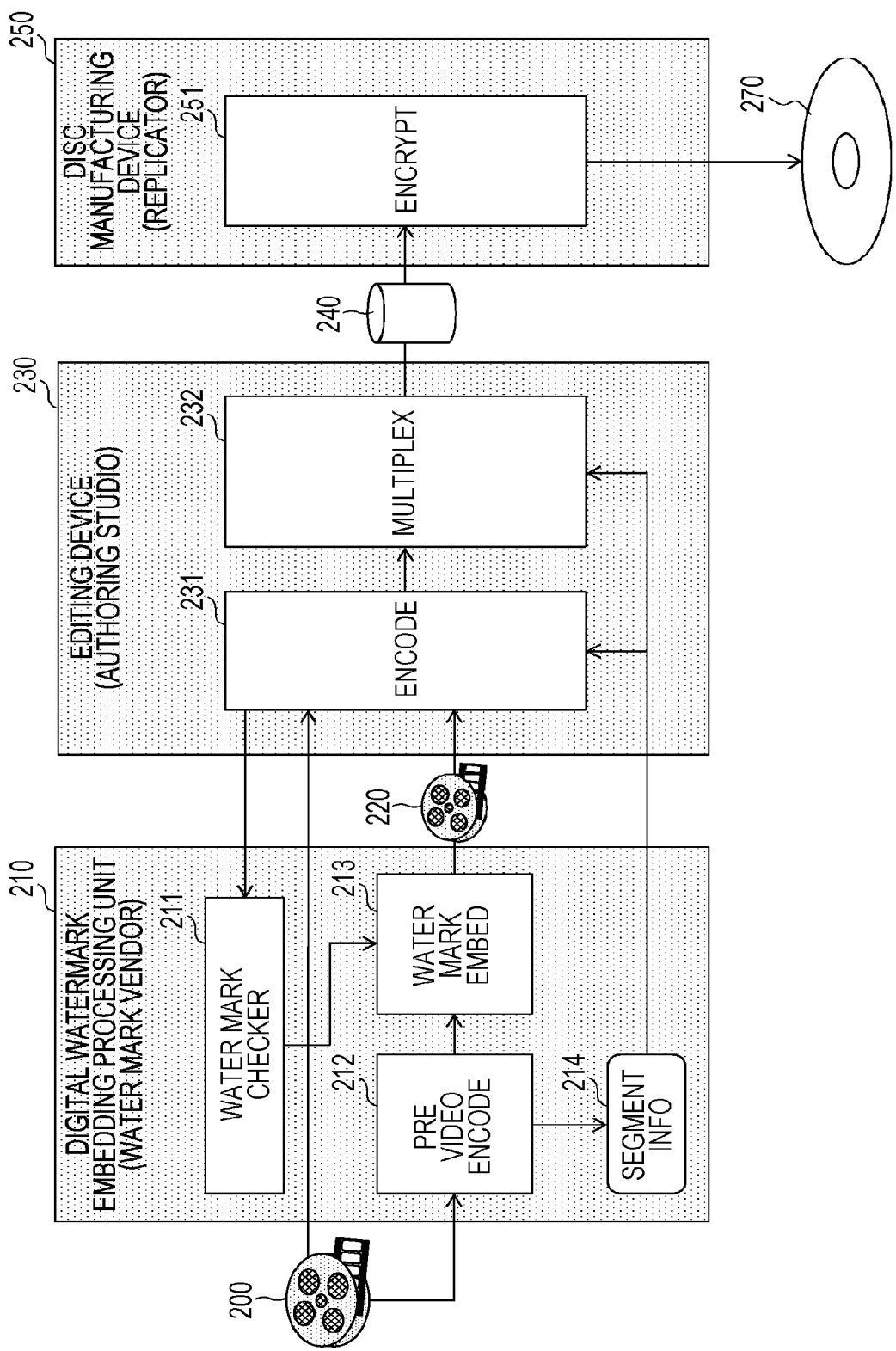
FIG. 22 is a diagram illustrating an example of manufacturing a disc on which the content having individual segment regions and common segment regions is recorded.

In FIG. 22, a digital watermark embedding processing unit 210, an editing device 230, and a disc manufacturing device 250 are illustrated.

The digital watermark embedding processing unit 210 includes a digital watermark verification unit (watermark checker) 211, a pre-video encoding unit (pre-video encode) 212, a digital watermark embedding unit (watermark embedded) 213, and a segment information (segment Info) 214.

The digital watermark embedding processing unit 210 performs processing of inputting the content 200 that is to digital watermark embedding, and determining the digital watermark embedded position in the pre-video encoding unit (pre-video encode) 212.

Figure 23:
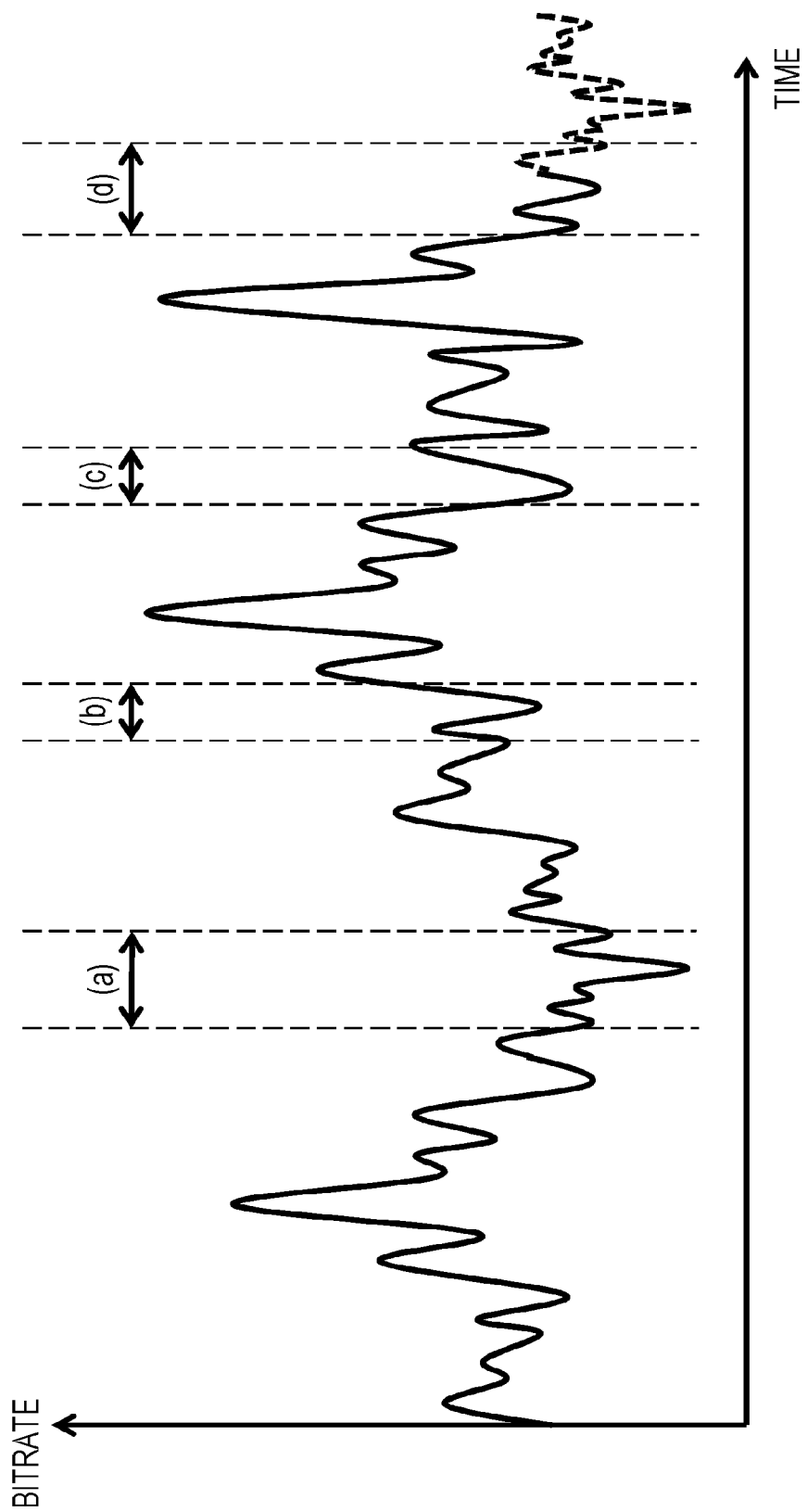
FIG. 23 is a diagram illustrating an example of determination processing of the individual segment region setting position.

Specifically, in order to select the best place as the digital watermark embedded position, the digital watermark embedding processing unit 210 calculates bit rate information corresponding to the reproduction time in the unit of GOP of the content as illustrated in FIG. 23.

The position where the bit rate is relatively low is selected as the digital watermark embedded position.

In the example illustrated in FIG. 23, each of the positions (a) to (d) is the position where the bit rate is relatively low, and those positions are selected as the digital watermark embedded position.

Each of those positions is set in the individual segment region and the digital watermark embedding is performed.

The pre-video encoding unit (pre-video encode) 212 executes the processing of determining the digital watermark embedding region and generates the segment information (segment info) 214 that includes the processing result.

The digital watermark embedded position determined by the pre-video encoding unit (pre-video encode) 212 is input to the digital watermark embedding unit (watermark embedded) 213, and the digital watermark embedding processing is performed.

A plurality of variation data is set in each individual segment region and the digital watermark embedding processing that is different from each other is performed on each variation data.

Each variation data is formed of a plurality of aligned units.

The digital watermark verification unit (watermark checker) 211 performs verification processing of the embedded digital watermark, and the verified digital watermark data is input to the digital watermark embedding unit (watermark embedded) 213, and then, digital watermark is embedded.

In the digital watermark embedding unit (watermark embedded) 213, a digital watermark embedded content 220 in which the digital watermark is embedded is provided to the editing device (authoring studio) 230.

Furthermore, the content 200 before the digital watermark embedding and the segment information (segment info) 214 are also provided to the editing device (authoring studio) 230.

For example, following information items are included in the segment information 214.

(1) GOP boundary information of the content 200

(2) Picture type (I, P, and B) arrangement information (3) Digital watermark (WM) embedded position information The editing device (authoring studio) 230 includes an encoding unit (encode) 231 and a multiplexing unit (multiplexer) 232.

The encoding unit (encode) 231 inputs the content 200 before the digital watermark embedding, the digital watermark embedded content 220, and the segment information 214, and then executes the encoding processing of the content.

The encoding unit (encode) 231 executes the encoding processing corresponding to each of the image, audio, and the subtitle.

When the processing is executed, the following information items acquired from the segment information 214 are taken into consideration, those are:

(1) the GOP boundary information of the content 200

(2) the picture type (I, P, and B) arrangement information (3) the digital watermark (WM) embedded position information.

The multiplexing unit (multiplexer) 232 acquires each of the encoded data of the image, audio, and the subtitle from the encoding unit (encode) 231, and generates the recorded data according to the data array on the disc.

For example, the arrayed data described with reference to FIG. 11B and FIG. 13B is generated.

When the arrayed data is generated, the following information items acquired from the segment information 214 are also taken into consideration, those are:

(1) the GOP boundary information of the content 200

(2) the picture type (I, P, and B) arrangement information (3) the digital watermark (WM) embedded position information.

The arrayed data 240 recorded on the disc generated by the multiplexing unit (multiplexer) 232 is output to the disc manufacturing device 250.

The disc manufacturing device 250 includes an encryption processing unit 251.

The encryption processing unit 251 executes the encryption processing of the data configuring the arrayed data 240 recorded on the disc which is generated by the multiplexing unit (multiplexer) 232.

With regard to the common segment region, the encryption processing is executed by applying the CPS unit key.

With regard to the individual segment region, the encryption processing is executed by applying the segment key corresponding to each variation data.

The encrypted content generated in the encryption processing is recorded on the disc, and the disc 270 is manufactured.

In addition to the encrypted content, various data previously described with reference to FIG. 4 are recorded on the disc 270.

10. A Hardware Configuration Example of the Information Processing Device

Figure 24:
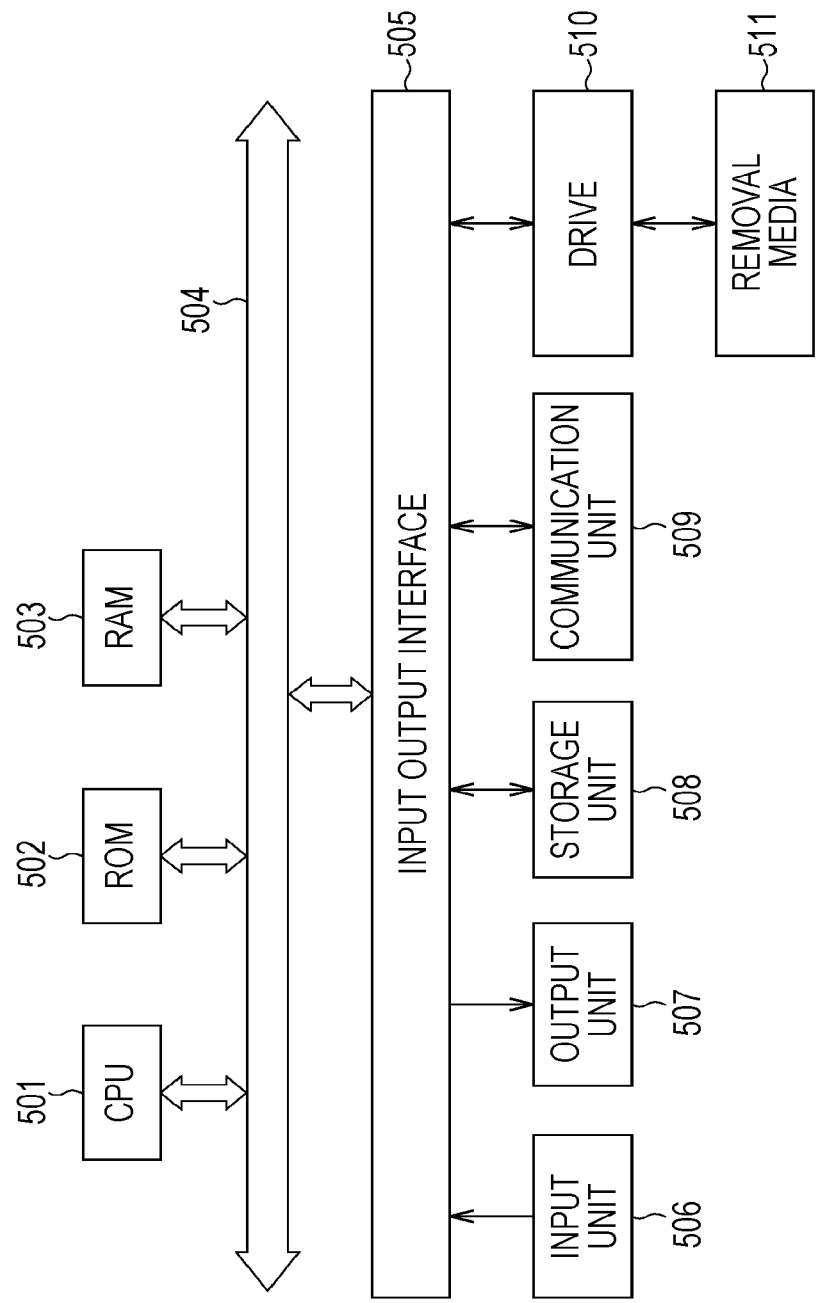
FIG. 24 is a diagram illustrating a configuration example of hardware of an information processing device.

Next, a hardware configuration example of the information processing device that executes the reproduction processing of the data recorded in the information recording medium having the data record configuration described in the above embodiment, or executes the data recording with respect to the information recording medium having the data record configuration described in the above embodiment, will be described with reference to FIG. 24.

A CPU (central processing unit) 501 functions as a data processing unit that executes various processing tasks according to a program stored in ROM (read only memory) 502 or in a storage unit 508. For example, the CPU 501 executes the processing tasks described in the above embodiment are executed. The program executed by the CPU 501 or the data is stored in RAM (random access memory) 503. This CPU 501, the ROM 502, and the RAM 503 are connected to each other by a bus 504.

The CPU 501 is connected to the input-output interface 505 via the bus 504. An input unit 506 such as various switches, a key board, a mouse, or a microphone, and an output unit 507 such as a display or a speaker are connected to the input-output interface 505. The CPU 501 executes various processing tasks according to the instruction input from the input unit 506, and outputs the processing result to, for example, the output unit 507.

The storage unit 508 connected to the input-output interface 505 is formed of, for example, a hard disc, and stores the program that is executed by the CPU 501 or various data. A communication unit 509 functions as a transmission and reception unit for the data communication via the network such as the internet or the local area network, and communicates with external devices.

A drive 510 connected to the input-output interface 505 drives a removal media 511 such as a magnetic disc and an optical disc, or a semiconductor memory such as a memory card, and executes the recording or the reading of the data.

The data encoding or the decoding can be executed as the processing by the CPU 501 as a data processing unit. However, a codec may be used as dedicated hardware for executing the coding or decoding processing.

11. Summary of the Configuration in the Present Disclosure

As described above, embodiments of the present disclosure have been described with reference to a specific embodiment. However, it is apparent that those skilled in the art can make modifications and substitutions of the embodiments without departing from the scope of the present disclosure. In other words, the present disclosure is disclosed in the form examples and it should not be construed as limiting the disclosure. In order to determine the gist of the present disclosure, it should be referred to the appended claims.

The technology disclosed herein may have the following configurations.

(1) An information processing device includes a data processing unit that executes reproduction processing of content recorded in an information recording medium, in which the content includes an individual segment region formed of a plurality of variation data in which identification information different from each other is embedded and each of which can be decrypted by the different key, and a common segment region formed of single data, in which the variation data is formed of a 6144 byte aligned unit, and in which the data processing unit calculates a reproduction path by applying a device key held in a memory, and selects an aligned unit corresponding to one variation data that corresponds to the calculated reproduction path from a plurality of aligned units configuring a plurality of variation data in the individual segment region included in the data read from the information recording medium, and then, executes the decryption and reproduction processing.

(2) The information processing device according to above (1), in which the data processing unit includes a filter processing unit that selects the aligned unit belonging to one variation data corresponding to the calculated reproduction path.

(3) The information processing device according to above (1), in which the data processing unit includes a decryption unit that selects and decrypts the aligned unit belonging to one variation data corresponding to the calculated reproduction path.

(4) The information processing device according to above (1), in which the data processing unit includes a separation unit that selects the aligned unit belonging to one variation data corresponding to the calculated reproduction path.

(5) The information processing device according to above (4), in which the separation unit selects the aligned unit belonging to one variation data corresponding to the calculated reproduction path based on a packet ID (PID) of a packet which configures the aligned unit.

(6) The information processing device according to any one of above (1) to (5), in which at least any of the variation data among the plurality of variation data set in the individual segment region has a configuration in which padding processing is performed using dummy data for matching the data size with the size of the other variation data, and in which data processing unit selects the aligned unit corresponding to one variation data which corresponds to the reproduction path from the plurality of aligned units that includes the aligned unit in which the dummy data is stored.

(7) The information processing device according to any one of above (1) to (6), in which the individual segment region is formed of video data only, and in which the data processing unit executes the reproduction processing of the video data read from the individual segment region and the common segment region and audio data read from the common segment region.

(8) The information processing device according to any one of above (1) to (7), in which the individual segment region is formed of only a B picture defined in an MPEG format, and in which the data processing unit reads the B picture from the individual segment region and I, P, and B pictures from the common segment region, and executes the decryption processing.

(9) The information processing device according to any one of above (1) to (7), in which the individual segment region is formed of only the B picture and the P picture defined in the MPEG format, and in which the data processing unit reads the B picture and the P picture from the individual segment region and the I, P, and B pictures from the common segment region, and executes the decryption processing.

(10) The information processing device according to any one of above (1) to (9), in which the data processing unit has a configuration in which the segment key applied to the decryption of the variation data is acquired from a segment key file in which an encrypted segment key is stored, in which the segment key file includes the data in which the encrypted segment key is associated with a start SPN which is a source packet number (SPN) of the source packet at the start position of the individual segment region and an end SPN which is a source packet number (SPN) of the source packet at the end position of the individual segment region, and in which the data processing unit determines the application region of the segment key based on the start SPN and the end SPN of each individual segment region.

(11) The information processing device according to any one of above (1) to (10), in which, in a case where random access reproduction is executed, the data processing unit executes the reproduction from the entry point that is set in the common segment region.

(12) An information recording medium that stores content including an individual segment region formed of a plurality of variation data in which identification information different from each other is embedded and each of which can be decrypted by the different key and a common segment region formed of single data, as recorded data, in which the variation data is formed of a 6144 byte aligned unit, and in which the information recording medium enables a reproduction device:

to calculate a reproduction path by applying a device key held in a memory; and to select an aligned unit corresponding to one variation data that corresponds to the calculated reproduction path from a plurality of aligned units configuring a plurality of variation data in the individual segment region included in the data read from the information recording medium, and then, to execute the decryption and reproduction processing.

(13) The information recording medium according to above (12), in which the individual segment region is formed of video data only.

(14) The information recording medium according to above (12) or (13), in which the individual segment region is formed of only a B picture defined in an MPEG format.

(15) The information recording medium according to above (12) or (13), in which the individual segment region is formed of only the B picture and a P picture defined in the MPEG format.

(16) The information recording medium according to any one of (12) to (15), in which at least any of the variation data among the plurality of variation data set in the individual segment region has a configuration in which padding processing is performed using dummy data for matching the data size with the size of the other variation data.

(17) An information processing method executing the processing in an information processing device, in which the information processing device includes a data processing unit that executes reproduction processing of content, in which the content includes an individual segment region formed of a plurality of variation data in which identification information different from each other is embedded and each of which can be decrypted by the different key, and a common segment region formed of single data, in which the variation data is formed of a 6144 byte aligned unit, and in which the data processing unit calculates a reproduction path by applying a device key held in a memory; and selects an aligned unit corresponding to one variation data that corresponds to the calculated reproduction path from a plurality of aligned units configuring a plurality of variation data in the individual segment region included in the data read from the information recording medium, and then, executes the decryption and reproduction processing.

(18) A program that causes an information processing device to execute information processing, in which the information processing device includes a data processing unit that executes reproduction processing of content, in which the content includes an individual segment region formed of a plurality of variation data in which identification information different from each other is embedded and each of which can be decrypted by the different key, and a common segment region formed of single data, in which the variation data is formed of a 6144 byte aligned unit, and the program causes the data processing unit:

to execute calculating processing of a reproduction path by applying a device key held in a memory; and to select an aligned unit corresponding to one variation data that corresponds to the calculated reproduction path from a plurality of aligned units configuring a plurality of variation data in the individual segment region included in the data read from the information recording medium, and then, to execute the decryption and reproduction processing.

In addition, a series of processing tasks described herein can be executed by hardware, software, or the combination thereof. In a case of executing the processing by the software, the processing may be executed by installing the program in which the processing sequence is recorded in the memory of the computer embedded in the dedicated hardware, or may be executed by installing the program in the general-purpose computer that can execute various processing tasks. For example, the program can be recorded in the recording media in advance. In addition to installing the program from the recording media to the computer, the program can be received via the network such as local area network (LAN) or the internet, and can be installed in the recording medium such as a built-in hard disc.

Various processing tasks described herein are executed not only in a time series manner according to the description but also in a parallel or individual manner according to the processing capacity or the necessity of the device that executes the processing. In addition, the system in the present Description is a logical combination of a plurality of devices, and is not limited to the configuration in which each of the devices are in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
   a data processing unit that executes reproduction processing of content recorded in an information recording medium,
   wherein the content includes an individual segment region formed of a plurality of variation data in which identification information different from each other is embedded and each of which can be decrypted by a different key, and a common segment region formed of single data,
   wherein the variation data is formed of a 6144 byte aligned unit, and
   wherein the data processing unit calculates a reproduction path by applying a device key held in a memory, and selects an aligned unit corresponding to one variation data that corresponds to the calculated reproduction path from a plurality of aligned units configuring the plurality of variation data in the individual segment region included in the data read from the information recording medium, and then, executes the decryption and reproduction processing.

2. The information processing device according to claim 1,
   wherein the data processing unit includes a filter processing unit that selects the aligned unit belonging to one variation data corresponding to the calculated reproduction path.

3. The information processing device according to claim 1,
   wherein the data processing unit includes a decryption unit that selects and decrypts the aligned unit belonging to one variation data corresponding to the calculated reproduction path.

4. The information processing device according to claim 1,
   wherein the data processing unit includes a separation unit that selects the aligned unit belonging to one variation data corresponding to the calculated reproduction path.

5. The information processing device according to claim 4,
   wherein the separation unit selects the aligned unit belonging to one variation data corresponding to the calculated reproduction path based on a packet ID (PID) of a packet which configures the aligned unit.

6. The information processing device according to claim 1,
   wherein at least any one of the variation data among the plurality of variation data set in the individual segment region has a configuration in which padding processing is performed using dummy data for matching the data size with the size of the other variation data, and
   wherein the data processing unit selects the aligned unit corresponding to one variation data which corresponds to the reproduction path from the plurality of aligned units that includes the aligned unit in which the dummy data is stored.

7. The information processing device according to claim 1,
   wherein the individual segment region is formed of video data only, and
   wherein the data processing unit executes the reproduction processing of the video data read from the individual segment region and the common segment region and audio data read from the common segment region.

8. The information processing device according to claim 1,
   wherein the individual segment region is formed of only a B picture defined in an MPEG format, and
   wherein the data processing unit reads the B picture from the individual segment region and I, P, and B pictures from the common segment region, and executes the decryption processing.

9. The information processing device according to claim 1,
   wherein the individual segment region is formed of only the B picture and the P picture defined in the MPEG format, and
   wherein the data processing unit reads the B picture and the P picture from the individual segment region and the I, P, and B pictures from the common segment region, and executes the decryption processing.

10. The information processing device according to claim 1,
    wherein the data processing unit has a configuration in which the segment key applied to the decryption of the variation data is acquired from a segment key file in which an encrypted segment key is stored,
    wherein the segment key file includes the data in which the encrypted segment key is associated with a start SPN which is a source packet number (SPN) of the source packet at the start position of the individual segment region and an end SPN which is a source packet number (SPN) of the source packet at the end position of the individual segment region, and
    wherein the data processing unit determines the application region of the segment key based on the start SPN and the end SPN of each individual segment region.

11. The information processing device according to claim 1,
    wherein, in a case where random access reproduction is executed, the data processing unit executes the reproduction from the entry point that is set in the common segment region.

12. An information recording medium that stores content including an individual segment region formed of a plurality of variation data in which identification information different from each other is embedded and each of which can be decrypted by a different key and a common segment region formed of single data, as recorded data,
    wherein the variation data is formed of a 6144 byte aligned unit, and
    wherein the information recording medium enables a reproduction device:
    to calculate a reproduction path by applying a device key held in a memory; and
    to select an aligned unit corresponding to one variation data that corresponds to the calculated reproduction path from a plurality of aligned units configuring a plurality of variation data in the individual segment region included in the data read from the information recording medium, and then, to execute the decryption and reproduction processing.

13. The information recording medium according to claim 12,
wherein the individual segment region is formed of video data only.

14. The information recording medium according to claim 12,
wherein the individual segment region is formed of only a B picture defined in an MPEG format.

15. The information recording medium according to claim 12,
wherein the individual segment region is formed of only the B picture and a P picture defined in the MPEG format.

16. The information recording medium according to claim 12,
wherein at least any one of the variation data among the plurality of variation data set in the individual segment region has a configuration in which padding processing is performed using dummy data for matching the data size with the size of the other variation data.

17. An information processing method executing the processing in an information processing device,
wherein the information processing device includes a data processing unit that executes reproduction processing of content,
wherein the content includes an individual segment region formed of a plurality of variation data in which identification information different from each other is embedded and each of which can be decrypted by the different key, and a common segment region formed of single data,
wherein the variation data is formed of a 6144 byte aligned unit, and
wherein the data processing unit calculates a reproduction path by applying a device key held in a memory; and selects an aligned unit corresponding to one variation data that corresponds to the calculated reproduction path from a plurality of aligned units configuring a plurality of variation data in the individual segment region included in the data read from the information recording medium, and then, executes the decryption and reproduction processing.

18. A program that causes an information processing device to execute information processing,
wherein the information processing device includes a data processing unit that executes reproduction processing of content,
wherein the content includes an individual segment region formed of a plurality of variation data in which identification information different from each other is embedded and each of which can be decrypted by the different key, and a common segment region formed of single data,
wherein the variation data is formed of a 6144 byte aligned unit, and
the program causes the data processing unit:
to execute calculating processing of a reproduction path by applying a device key held in a memory; and
to select an aligned unit corresponding to one variation data that corresponds to the calculated reproduction path from a plurality of aligned units configuring a plurality of variation data in the individual segment region included in the data read from the information recording medium, and then, to execute the decryption and reproduction processing.

* * * * *